US012583628B2

(12) United States Patent
Wilson et al.

(10) Patent No.: US 12,583,628 B2
(45) Date of Patent: Mar. 24, 2026

(54) DEPLOYABLE, ULTRA-STOWABLE TRUSS FOR SPACE APPLICATIONS

(71) Applicant: Overview Energy Inc., Ashburn, VA (US)

(72) Inventors: Lee Wilson, North Hollywood, CA (US); Marc Berte, Leesburg, VA (US)

(73) Assignee: Overview Energy Inc., Ashburn, VA (US)

( * ) Notice: Subject to any disclaimer, the term of this patent is extended or adjusted under 35 U.S.C. 154(b) by 0 days.

(21) Appl. No.: 19/227,995

(22) Filed: Jun. 4, 2025

(65) Prior Publication Data

US 2025/0368358 A1 Dec. 4, 2025

Related U.S. Application Data

(60) Provisional application No. 63/655,729, filed on Jun. 4, 2024.

(51) Int. Cl.
*B64G 1/22* (2006.01)
(52) U.S. Cl.
CPC .................................. *B64G 1/2224* (2023.08)
(58) Field of Classification Search
CPC ... B64G 1/2224; E04B 1/3441; E04B 1/3442; E04B 1/3445; E04C 3/005
See application file for complete search history.

(56) References Cited

U.S. PATENT DOCUMENTS

| | | | | |
|---|---|---|---|---|
| 4,482,900 | A | * | 11/1984 | Bilek ................... H01Q 15/161 343/915 |
| 4,569,176 | A | | 2/1986 | Hedgepeth |
| 4,819,399 | A | * | 4/1989 | Onoda ................. H01Q 1/1235 52/645 |
| 5,125,206 | A | * | 6/1992 | Motohashi ............ E04B 1/1909 52/646 |
| 5,228,258 | A | * | 7/1993 | Onoda ................... B64G 99/00 343/915 |

(Continued)

OTHER PUBLICATIONS

Kitamura, Takayuki, et al. "Development of a high stiffness extendible and retractable mast'HIMAT'for space applications." 31st structures, structural dynamics and materials conference. 1990.

(Continued)

*Primary Examiner* — Theodore V Adamos
(74) *Attorney, Agent, or Firm* — Butzel Long

(57) ABSTRACT

Implementations of the disclosed subject matter provide a system including a truss that may have a plurality of bays. Each bay may include a plurality of longerons disposed in a longitudinal direction, a plurality of battens disposed in a transverse direction, and at least two longitudinal struts that are coupled by hinges that are configured to allow the at least two longitudinal struts to fold towards an interior of each bay of the truss, where at least one batten may connect and separate at least one longitudinal strut. The longitudinal struts, the longerons, and the battens may be connected to form the bay, where each side of the bay may be formed from two battens that are joined end-to-end, and where at least some of plurality of battens respectively separate at least some of the plurality of longerons. The truss may be configured to be stowed longitudinally and transversely.

19 Claims, 15 Drawing Sheets

(56)         References Cited

U.S. PATENT DOCUMENTS

| 7,716,897 B2 * | 5/2010 | Merrifield | .............. B64G 99/00 |
| | | | 52/645 |
| 9,249,565 B2 | 2/2016 | Merrifield | |
| 2006/0107611 A1 | 5/2006 | Merrifield | |
| 2008/0283670 A1 | 11/2008 | Harvey | |
| 2015/0101261 A1 * | 4/2015 | Merrifield | ................ E04C 3/08 |
| | | | 52/67 |
| 2016/0362892 A1 | 12/2016 | Murphey | |
| 2022/0363414 A1 | 11/2022 | Harvey | |

OTHER PUBLICATIONS

Cebeci, Yunus. Design of Hidam: Highly Deployable Articulated Mast for Positioning of Satellite Components. MS thesis. Izmir Institute of Technology (Turkey), 2022.

Tibert, Gunnar, and Sergio Pellegrino. "Deployable tensegrity masts." 44th AIAA/ASME/ASCE/AHS/ASC Structures, Structural Dynamics, and Materials Conference. 2003.

Jesen, F., and S. Pellegrino. "Arm development review of existing technologies." (2001).

Shan, Minghe, et al. "Design and analysis of a trinagular prism modular deployable mast." 2013 IEEE International Conference on Mechatronics and Automation. IEEE, 2013.

* cited by examiner

*100*
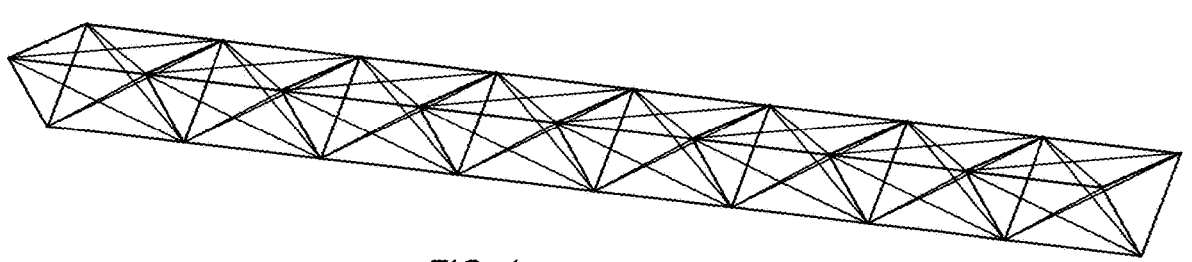
*FIG. 1*
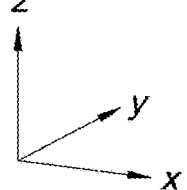
*Longitudinal = x*
*Transverse = y, z*

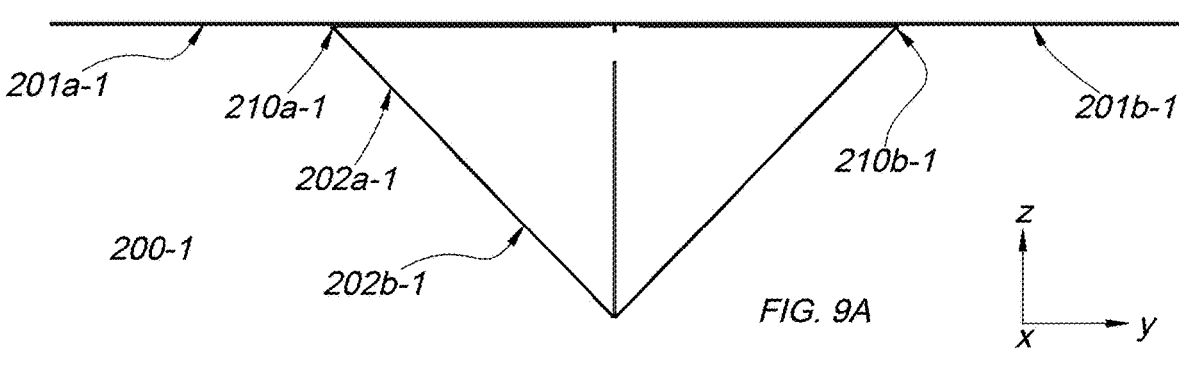
FIG. 9A
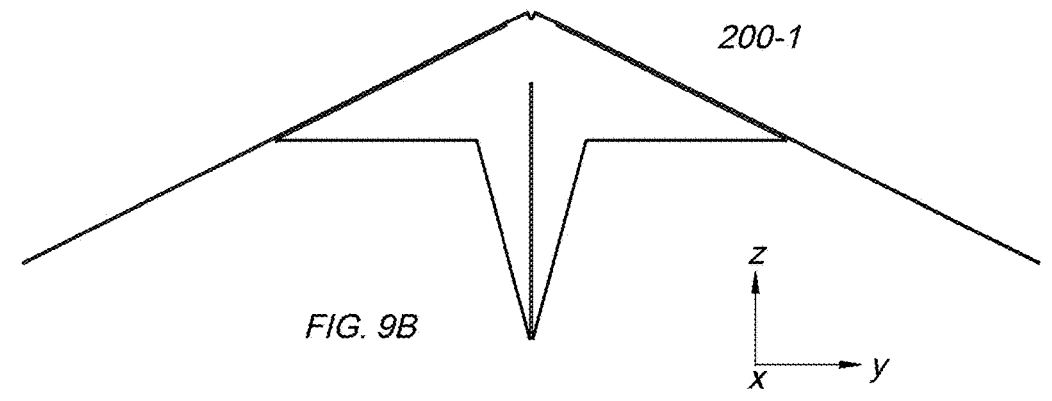
FIG. 9B
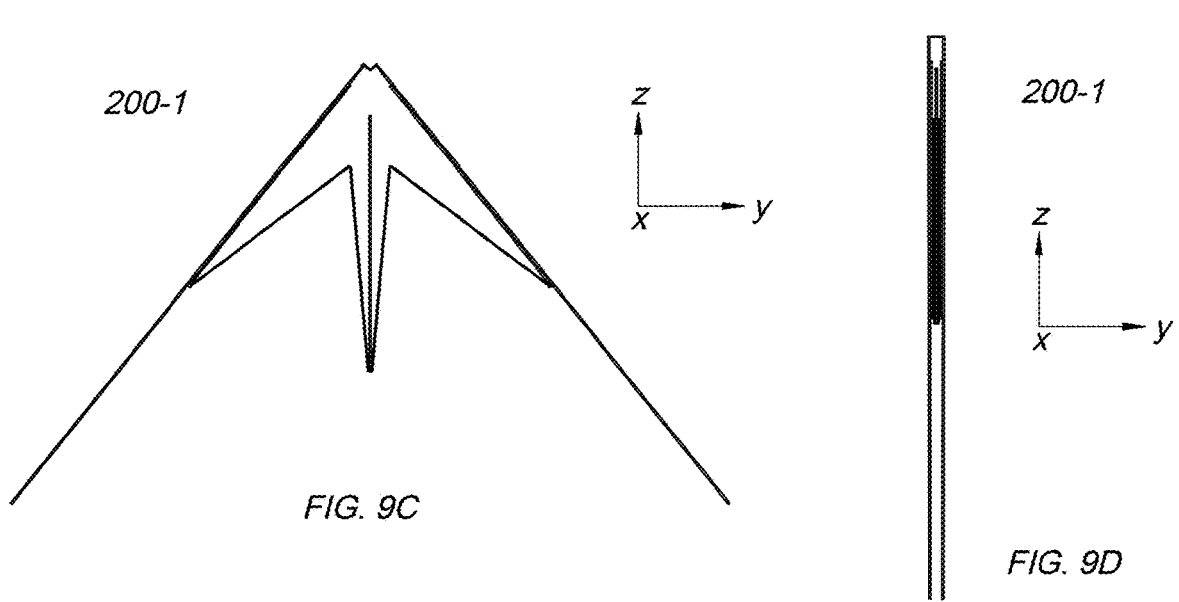
FIG. 9C
FIG. 9D $$L_1 - L_2 + L_3 \approx sqrt((L_2 + L_3)^2 - L_1^2)$$

DEPLOYABLE, ULTRA-STOWABLE TRUSS FOR SPACE APPLICATIONS

BACKGROUND

Structures launched into space need to fit within the volume constraints of a payload fairing. Very large launch vehicles, such as SpaceX™'s Starship or NASA's SLS (Space Launch System), allow for the largest proposed space structures to be increased to the order of hundreds of meters in size. To achieve this, one current approach is to use a deployable truss that is stowed in a small volume for launch, and then expands to its full size in space. These are used most often for solar arrays and RF antennas. Current truss-based masts that have been developed for these applications all package longitudinally.

BRIEF SUMMARY

Implementations of the disclosed subject matter provide a system including a truss that may have a plurality of bays. Each bay may include a plurality of longerons disposed in a longitudinal direction, a plurality of battens disposed in a transverse direction, and at least two longitudinal struts that are coupled by hinges that are configured to allow the at least two longitudinal struts to fold towards an interior of each bay of the truss, where at least one batten of the plurality of battens may connect and separate at least one longitudinal strut of the plurality of longitudinal struts. The at least two longitudinal struts, the plurality of longerons, and the plurality of battens may be connected to form the bay, where each side of the bay may be formed from two battens of the plurality of battens that are joined end-to-end, and where at least some of plurality of battens respectively separate at least some of the plurality of longerons. The truss may be configured to be stowed longitudinally and transversely.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 1 shows an isometric view of an example Deployable Ultra-Stowable Truss (DUST) with 8 bays, and details the longitudinal (x) and transverse (y, z) directions, according to an implementation of the disclosed subject matter.

FIG. 2G shows a closeup view of a base batten-longeron node, and FIGS. 2H and 2I show closeup views of top batten-longeron nodes.

FIGS. 9A-9D show front views of a single bay of a DUST with top battens that extend beyond the hinge-line with the side battens, and show steps for stowing in the transverse direction, according to implementations of the disclosed subject matter.

DETAILED DESCRIPTION

Figures 2A, 2B, 2C, 2D:
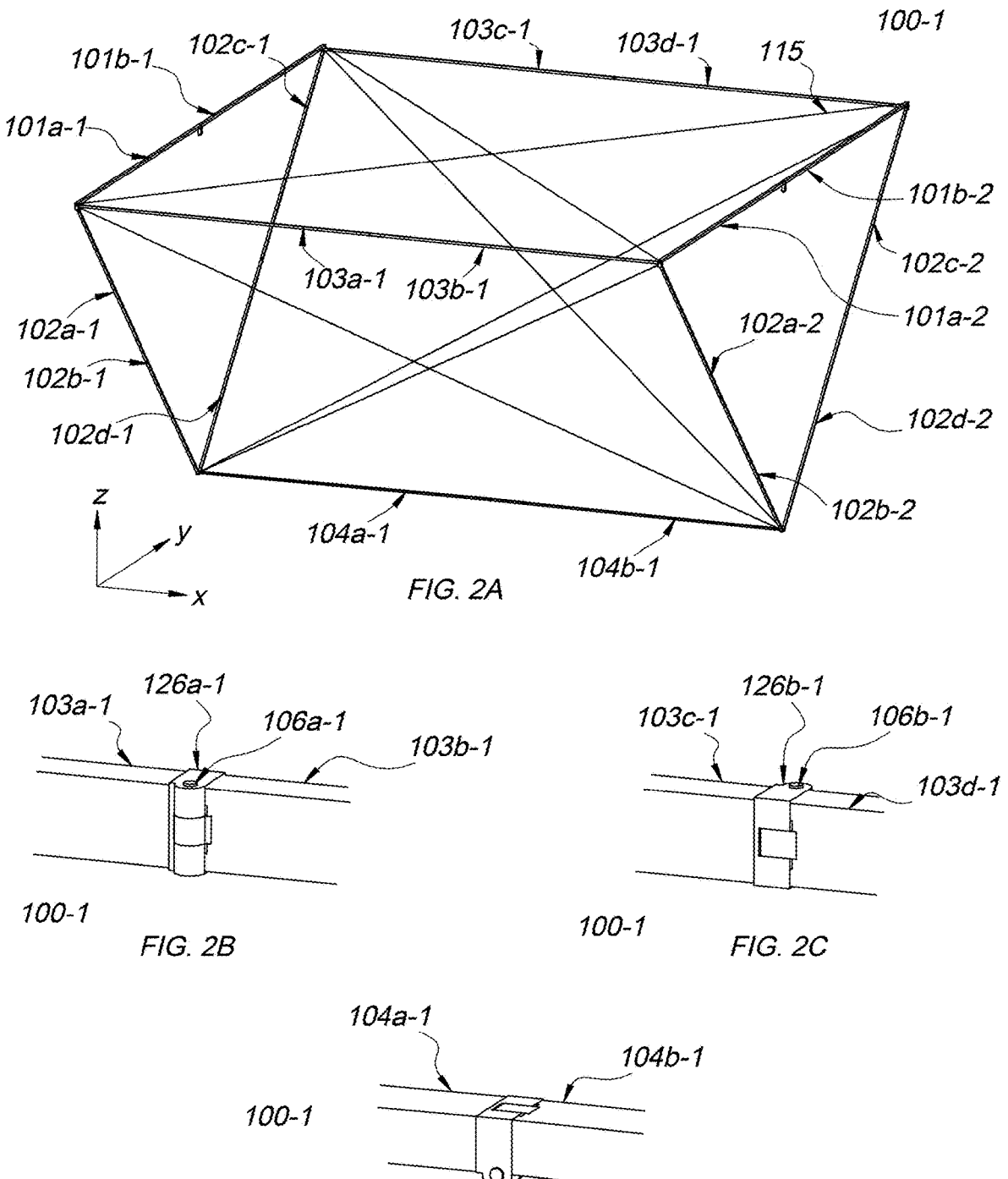
FIGS. 2A-2I show isometric views of a single bay of a Deployable Ultra-Stowable Truss (DUST) according to an implementation of the disclosed subject matter. Closeup views of nodes that are part of the DUST are shown in FIGS. 2B-2I, with FIGS. 2B and 2C showing top intra-longeron nodes, FIG. 2D showing a base intra-longeron node, FIG. 2E showing a side intra-batten node, and FIG. 2F showing a top intra-batten node.

The figures and the following description illustrate specific exemplary embodiments. It will be appreciated that those skilled in the art will be able to devise various arrangements that, although not explicitly described or shown herein, embody the principles described herein and that follow this description. Furthermore, any examples described herein are intended to aid in understanding the principles of the disclosure, and are to be construed as being without limitation. As a result, this disclosure is not limited to the specific embodiments or examples described below.

Implementations of the disclosed subject matter provide a truss to stow both longitudinally and transversely for large scale space applications. In some implementations, a truss may include a plurality of longerons disposed in a longitudinal direction that are separated by battens disposed in a transverse direction. In some implementations, the truss may include a plurality of repeating bays. In some implementations, a sequencing mechanism may be configured to deploy each of the plurality of repeating bays, one at a time, in the longitudinal direction. In some implementations, the truss may have a cross-section that may change along its length, such as by tapering. In some implementations, in a single bay each longeron may include two longitudinal struts which are connected by hinges. At each end of the bay, battens may be disposed in the transverse direction, where the battens connect and separate the longitudinal struts. To stow in the longitudinal direction, the hinges connecting the longitudinal struts fold. When fully folded, the battens from a first end of a bay are stacked adjacent to the battens from a second end of the bay.

In an implementation of the disclosed subject matter, each longeron may be connected to two other longerons, where each connection may be formed by two battens. Observed from the longitudinal direction, the longerons may form a polygonal structure, with nodes as the longerons and each side of the polygon made from two battens that are joined end-to-end. Some implementations may include three longerons and six battens, but the number of longerons can be higher. For example, some implementations may use four longerons disposed in a rectangle pattern or may use five longerons disposed in a pentagram configuration. The length of the battens does not need to be equal, nor does the cross-section need to be symmetric.

The battens may be connected to each other and to the longerons via hinges. One or more of the hinges may have an axis of rotation that is approximately parallel to the longitudinal direction. As used throughout, hinges whose angle interior to the truss that increases during stowing will be termed valley hinges, while hinges that decrease the angle formed between connected battens will be termed hill hinges.

The battens may be separated into two groups: (1) top battens, and (2) side battens. The longerons may be separated into two groups: (1) top longerons, and (2) base longerons. In some implementations, two top battens may connect two top longerons, and a hinge connecting the one top batten to the other may be offset from the batten centerline in a transverse direction internal to the truss. This offset quantity is based on how the battens stack together when in a fully folded configuration, which occurs when the truss is stowed both longitudinally and transversely. The hinge may be a hill hinge.

Tensioned diagonals may be installed on the external faces of each bay and may provide high stiffness in tension and torsion. The tensioned diagonals may either be flexible structures, such as wires. In some implementations, the tensioned diagonals may include rigid segments connected by a flexible cable located only in the fold region to make their stowage repeatable and controlled. In some implementations, one or more of the tensioned diagonals may include a plurality of springs. For example, a tensioned diagonal may include a first spring having a first spring constant, and a second spring having a second spring constant, where the second spring constant is a higher value than the first spring constant. The first spring may maintain tension on the tensioned diagonal as it deploys (i.e., the first spring may increase in length as the diagonal deploys). At the end of travel of the first spring during deployment, the second spring may be configured to engage to provide stiffness in the deployed configuration.

In some implementation, the remaining battens may be side battens, and the remaining longitudinal struts may be side longitudinal struts. The side battens may be connected to top and side longitudinal struts via hinges whose axis of rotation is approximately parallel to the longitudinal direction. Battens may be connected to each other at a longeron, where the connection is via hill hinges. The hinges not located at longerons and between side battens may be valley hinges. To stow transversely, both valley and hill hinges may be folded until the battens package tightly against each other.

When fully folded, the exterior of the top battens may remain uncovered, allowing hardware to be mounted on the exterior of the top battens. One advantage of this approach when compared to coiled trusses is that the top battens for each bay may remain external during the entire stowage and deployment process, which may allow external elements like solar arrays, radio frequency (RF) antenna, or the like to have a mounting location at each bay. This is important because structural stability is important for their performance. Arrangements with coiled trusses or booms only allow hardware to be connected to each end unless it coils with the truss or boom, which is often not feasible.

The truss may be stowed transversely before stowing longitudinally, or both transverse and longitudinal storage may occur simultaneously. Transverse and longitudinal storage may be independent of each other. Performing longitudinal stowage first and then performing transverse stowage, and deploying in reverse order, is merely used in some implementations of the disclosed subject matter.

In some implementations, the top battens may extend beyond a junction with the top longerons. This may allow for a smaller truss than the size of the elements that need to be mounted to it, such as solar arrays, RF antennas, or the like.

In some implementations, linear actuators may be added to the top and base longerons to allow the longeron length to be controlled. This may allow the truss shape to be controlled, as well as to correct for manufacturing imperfections, thermal expansion, and/or solar pressure. This arrangement may allow for active control of the structure to damp out vibrations.

Implementations of the disclosed subject matter improve upon current structures by being configured to package in both longitudinal and transverse directions. This allows a larger structure to be stored within the same volume. The volume of structures sent into space is generally constrained by the payload fairing of the launch vehicle. For example, SpaceX™'s Starship launch vehicle is proposed to have an 8 m diameter payload dynamic envelope, so any truss that is both taller and wider than 8 m needs to be able to package transversely. This is the case for many proposed space megastructures, such as space based solar power spacecraft that beam power down to Earth.

The improved packaging efficiency of implementations of the disclosed subject matter for a Deployable Ultra-Stowable Truss (DUST) provide benefits to smaller spacecraft, because often multiple spacecraft are packaged within a single fairing, meaning they also experience very tight volume constraints. As a truss, implementations of the disclosed subject matter for a Deployable Ultra-Stowable Truss (DUST) may provide increased stiffness of deployable elements such as photovoltaic panels, antenna, and the like, which would normally need to use other deployable mechanisms such as Z-folded honeycomb panels to increase stiffness within volume constraints.

Implementations of the disclosed subject matter related to enabling the deployment of large scale structures in space by allowing them to be packaged more efficiently. Deployable Ultra-Stowable Trusses (DUST) are detailed in various implementations of the disclosed subject matter. These trusses may provide structural rigidity to large scale space structures, as well as allow them to package tightly for launch into space on a launch vehicle. In some implementations, the truss may be configured to deploy a solar array, antenna wing, or the like that is about 100 m long and 10 m wide. The battens and longerons may be configured to sustain both tension and compression loads, and may be constructed out of standard space grade materials such as carbon-fiber reinforced polymer (CFRP), aluminum alloy, titanium, or the like. The tensioned diagonals may be configured to sustain tension loads, and may be made from a material such as steel braided cable, or the like. To ensure repeatable stowing and deployment, the tensioned diagonals may be configured to be a combination of rigid elements with flexible cables located in fold regions. In some implementations, one or more of the tensioned diagonals may include a plurality of springs. For example, a tensioned diagonal may include a first spring having a first spring constant, and a second spring having a second spring constant, where the second spring constant is a higher value than the first spring constant. The first spring may maintain tension on the tensioned diagonal as it deploys (i.e., the first spring may increase in length as the diagonal deploys). At the end of travel of the first spring during deployment, the second spring may be configured to engage to provide stiffness in the deployed configuration.

The following describes an example general implementation of a DUST kinematically. Example implementations of a DUST is described in detail below in connection with FIGS. 1-10. The general implementation and example implementations described throughout may be used, but other implementations of DUST may be possible.

The truss of the general DUST arrangement may have three orthogonal axes divided into a single longitudinal direction (x direction) and two transverse directions (y direction, z direction). The truss may include multiple similar and/or identical bays disposed along the longitudinal direction (x direction), so a single bay may be a repeating unit of the truss. Each bay may have straight dimensionally stable rigid elements called longerons and battens. In some implementations, the truss may have a cross-section that may change along its length, such as by tapering, so that the repeating bays are not identical. In some implementations, a sequencing mechanism may be configured to deploy each of the plurality of bays, one at a time, in the longitudinal direction. That is, the sequencing mechanism may deploy each of the bays, regardless of whether the bays are the same, similar, or non-identical bays.

In the fully deployed configuration, a bay may form a polygonal prism. In one implementation, the bay may be configured as a triangular prism, with battens forming the edges of the triangular faces, and longerons forming the remaining edges of the rectangular faces. There may be three types of nodes that are located at the intersection of battens and/or longerons. Batten-longeron nodes may be located at the intersection of battens and longerons, and may include single degree-of-freedom (SDOF) couplings for both battens and longerons. In this example implementation, intra-batten nodes may be located at the intersection of two battens only, intra-longeron nodes are located at the intersection of two longerons only. Both intra-batten nodes and intra-longeron nodes may include only one SDOF coupling for any polygonal prism implementation. For the general implementation, the triangular faces may lie on planes parallel to the y-z plane, and the rear triangular face is on the −x end of the bay, and the front triangular face on the +x end of the bay. The x, y, and z directions and/or planes are shown in FIGS. 1-10.

In the fully deployed configuration of a triangular prismatic truss, the triangular end may face edges form a triangle with a peak in the −z direction.

Each edge of the triangular faces may be formed from two battens connected end-to-end at an intra-batten node that incorporates a SDOF coupling whose rotation axis is parallel to the x direction. The packaging of these battens in implementations of the disclosed subject matter differ from those of prior batten arrangements. The two battens on a triangular face edge opposite the −z peak are called top battens, while the other two edges may be formed from side battens.

The corners of the triangular face may be formed from batten-longeron nodes. Batten-longeron nodes may have one or two SDOF couplings whose rotation axis is parallel to the x direction that interface with the battens. The longerons may connect to the batten-longeron nodes via SDOF couplings whose axis of rotation is perpendicular to the x direction.

The SDOF coupling axis between the top battens may be offset towards the center of the triangular face to provide room for the side battens during stowage.

In the general implementation of the DUST, the batten-longeron nodes adjacent to the top battens are called top batten-longeron nodes, and may be rigidly fixed to the top battens so they only have one SDOF coupling with an axis parallel to the x axis connecting the top and side battens. In some implementations, the top batten-longeron node may be rigidly fixed to the side batten, or may be replaced by a SDOF coupling with an axis parallel to the x axis. In some implementations, the top batten-longeron nodes may not be rigidly fixed to the top battens. This arrangement may allow for rotation of the top battens to the interior.

For a triangular prism bay, the remaining batten-longeron node may be a base batten-longeron node. For a polygon of n sides, there may be n−2 base batten-longeron nodes. In the general embodiment of the DUST, the side battens may connect to all batten-longeron nodes via SDOF couplings whose axis is parallel to x. In other implementations, the base batten-longeron nodes may be rigidly attached to a single batten each so they each contain only one SDOF coupling to a batten.

The SDOF couplings on the intra-batten nodes and batten-longeron nodes may be configured to allow the battens to fold in-plane for stowage. The SDOF couplings can be split into two types. The first type may be couplings whose angle interior to the truss increases during stowing are called valley joints. The second type may be couplings whose angle interior to the truss decreases during stowing are called hill joints.

The SDOF coupling on the intra-batten node between the two top battens may be a hill joint. All SDOF couplings between the batten-longeron nodes and battens may be hill joints as well, while all intra-batten node SDOF couplings between side battens may be valley joints.

When stowed transversely, the side battens connected to top batten-longeron nodes may fold towards the top battens. The side battens connected to the remaining base batten-longeron node may fold towards the x-z plane. When completely folded, all battens may be parallel to the x-z plane.

When in the deployed configuration, each longitudinal edges of the prism may be formed from two longeron joined end-to-end, with each longeron connecting to a batten-longeron node via a SDOF coupling, and the two longerons may be connected together at an intra-longeron node with a SDOF coupling.

The longerons may be divided into two types. Top longerons may be those connected to a top batten-longeron node. Base longeron may connect to a base batten-longeron node. In the general implementation of the DUST, the SDOF couplings on the top longerons may have an axis of rotation perpendicular to both the longitudinal x direction and the top batten they may be connected to via the top batten-longeron node. This arrangement may maximize packaging efficiency, but other implementations may have SDOF couplings on the top longerons whose axis may be perpendicular to the longitudinal x direction only.

In the general implementation of the DUST, the base longerons may have SDOF couplings whose axis of rotation is nominally parallel to the y axis, but may not be necessarily so in other implementations. SDOF couplings between batten-longeron nodes and longerons may be all hill joints, while longeron-to-longeron SDOF couplings on intra-longeron nodes may be all valley joints. This example configuration may allow the bay to fold longitudinally until all longerons may be parallel to the battens.

As described earlier, when both battens and longerons are fully deployed in the general implementation of DUST, the bay may form a triangular prism, with battens forming triangular faces and longerons rectangular faces. In the general implementation of DUST tensioned diagonals may link the batten-longeron nodes on the opposite corners of the rectangular faces to provide torsional stiffness. In this example, tensioned diagonals may be stiff cables, but other structures may be used. Tensioned diagonals may be stiff in the fully deployed configuration, but may be configured to compact while the longerons stow longitudinally and/or the battens stow transversely. In alternative implementations, the tensioned diagonals may be replaced by alternative stiffening members that provide torsional stiffness while still allowing the longerons stow longitudinally and/or the battens stow transversely.

As discussed above, one or more of the tensioned diagonals may include a plurality of springs in some implementations. In this example arrangement, a tensioned diagonal may include a first spring having a first spring constant, and a second spring having a second spring constant, where the second spring constant is a higher value than the first spring constant. The first spring may maintain tension on the tensioned diagonal as it deploys (i.e., the first spring may increase in length as the diagonal deploys). At the end of travel of the first spring during deployment, the second spring may be configured to engage to provide stiffness in the deployed configuration.

FIG. 1 shows a triangular DUST 100 with 8 bays in the deployed configuration according to an implementation of the disclosed subject matter. A bay is generally defined as the smallest structurally independent unit cell of a truss. Although 8 bays are shown in the DUST 100 of FIG. 1, this is merely an example, and more or fewer bays may be used in the DUST 100. FIG. 1 details example longitudinal (x) and transverse (y, z) directions of the DUST 100. In some implementations, a sequencing mechanism may be configured to deploy each of the bays of the DUST 100 (e.g., each of the 8 bays, or more or fewer than 8 bays), one at a time, in the longitudinal direction.

FIGS. 2A-2I show detailed views of a single bay 100-1 of triangular DUST 100 of FIG. 1. FIG. 2A shows the single bay 100-1 of triangular DUST 100, where the bay 100-1 may include four top longitudinal struts 103a-1, 103b-1, 103c-1, and 103d-1, and two base longitudinal struts, 104a-1 and 104b-1. These example longitudinal struts may be disposed in the x direction. As used herein, the number after the dash ("–") refers to bay number. These longitudinal struts are separated by six transverse battens. The top longitudinal struts 103a-1 and 103c-1 may be separated by two top battens, 101a-1 and 101b-1. The top longitudinal strut 103a-1 may be separated from the base longitudinal strut 104a-1 by two side battens, 102a-1 and 102b-1. The top longitudinal strut 103c-1 may be separated from the base longitudinal strut 104a-1 by side battens 102c-1 and 102d-1. FIGS. 2B-2D show close-up views of hinges that connect the longitudinal struts shown in FIG. 2A.

FIGS. 2B-2C show top intra-longeron nodes, with FIG. 2B shows a close-up view of a top intra-longeron hinge 106a-1 of top intra-longeron node 126a-1 that connects the top longitudinal struts 103a-1 and 103b-1 of the bay 100-1 of the triangular DUST shown in FIG. 2A. In some implementations, the top intra-longeron hinge 106a-1 may be a spring-loaded hinge. That is, a compression spring may be disposed inside of at least one of top longitudinal struts 103a-1 and 103b-1. One end of the compression spring may be coupled to a stop inside the top longitudinal strut 103a-1 or the top longitudinal strut 103b-1, and the other end of the compression spring may be coupled to the top intra-longeron hinge 106a-1. A hinge control cable may be coupled to the stop on one end, may be arranged along an edge of the top intra-longeron hinge 106a-1, and may be coupled to an end of the top intra-longeron hinge 106a-1. This implementation may allow for the top intra-longeron hinge 106a-1 to self-open by using the spring tension of the compression spring when this portion of the bay 100-1 is deployed.

FIG. 2C shows a close-up view of a top intra-longeron hinge 106b-1 of top intra-longeron node 126b-1 that connects the top longitudinal struts 103c-1 and 103d-1 of FIG. 2A. In some implementations, the top intra-longeron hinge 106b-1 may be a spring-loaded hinge. In some implementations, the spring used may be a compression spring, tension spring, torsion spring, and/or other mechanism that utilizes stored strain energy. For a compression spring case, one or more compression spring may be disposed inside of one of top longitudinal struts 103c-1 and 103b-1. One end of the compression spring may be coupled to a stop inside the top longitudinal strut 103a-1 or top longitudinal strut 103b-1, and the other end of the compression spring may be coupled to the top intra-longeron hinge 106b-1. A hinge control cable may be coupled to the stop on one end, may be arranged along an edge of the top intra-longeron hinge 106b-1, and coupled to an end of the top intra-longeron hinge 106a-1. This implementation may allow for the top intra-longeron hinge 106b-1 to self-open by using the spring tension of the compression spring when this portion of the bay 100-1 is deployed.

FIG. 2D shows a close-up of base intra-longeron hinge 107-1 of base intra-longeron node 127-1 that connects the base longitudinal struts 104a-1 and 104b-1 of FIG. 2A. In some implementations, the base intra-longeron hinge 107-1 may be a spring-loaded hinge. That is, a compression spring may be disposed inside of one of base longitudinal struts 104a-1 and 104b-1. One end of the compression spring may be coupled to a stop inside the base longitudinal strut 104a-1 or base longitudinal strut 104b-1, and the other end of the compression spring may be coupled to the base intra-longeron hinge 107-1. A hinge control cable may be coupled to the stop on one end, may be arranged along an edge of the base intra-longeron hinge 107-1, and coupled to an end of base intra-longeron hinge 107-1. This implementation may allow for the base intra-longeron hinge 107-1 to self-open by using the spring tension of the compression spring when this portion of the bay 100-1 is deployed.

Top longitudinal struts 103b-1 and 103d-1 may connect to the start of the second bay (e.g., connect bay 100-1 to the next bay in the DUST 100 shown in FIG. 1), and thus may be separated by top battens 101a-2 and 101b-2. Likewise, top longitudinal strut 103b-1 may be separated from base longitudinal strut 104b-1 by side battens 102a-2 and 102b-2. Top longitudinal strut 103d-1 may be separated from base longitudinal strut 104b-1 by side battens 102c-2 and 102d-2.

Figure 2E:
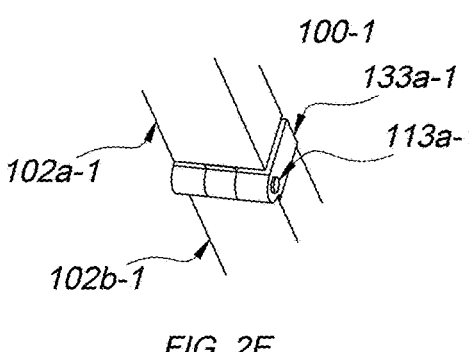
Figure 2F:
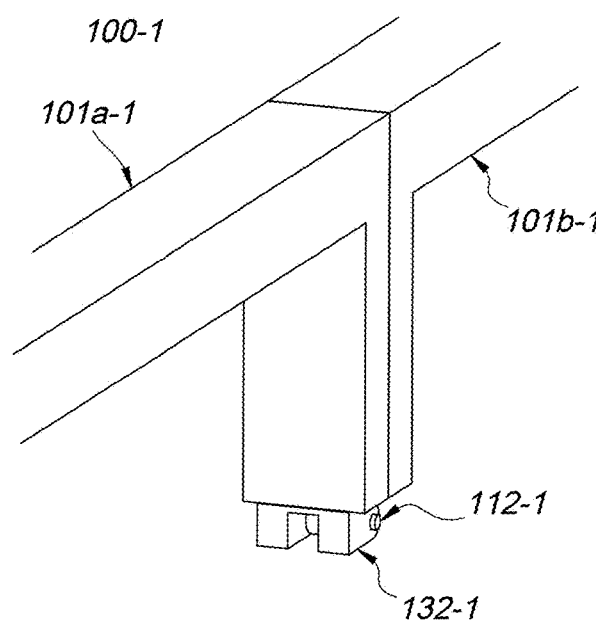
Figure 2G:
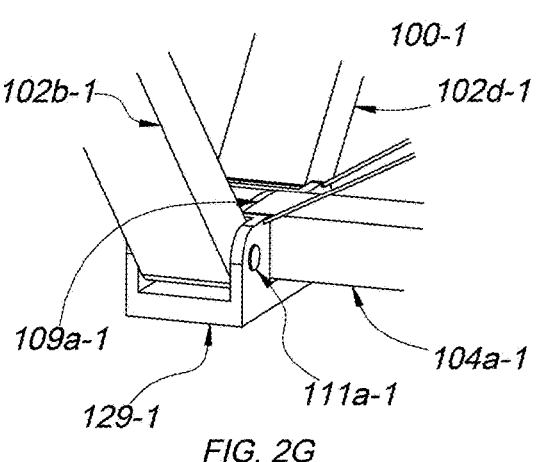
Figure 2H:
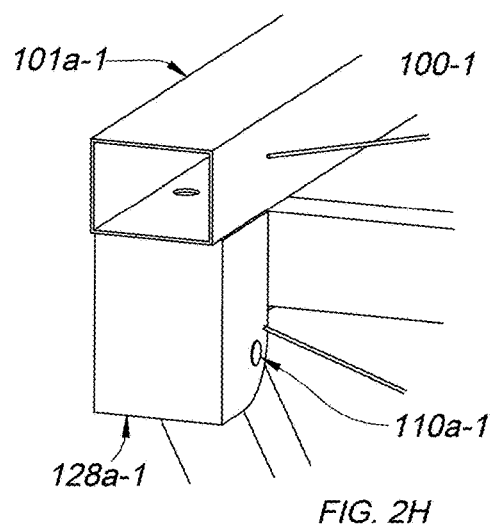
Figure 2I:
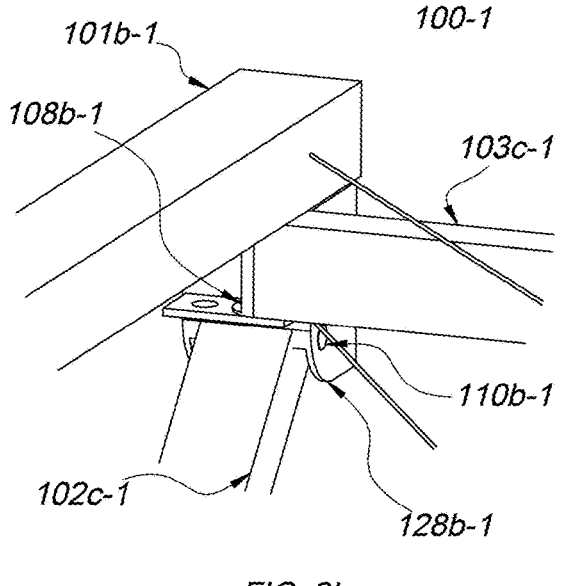

FIG. 2E shows a side intra-batten node, and FIG. 2F showing a top intra-batten node according to an implementation of the disclosed subject matter. FIG. 2E shows a side intra-batten node 133a-1 having side transverse hinge 113a-1 that couples side battens 102a-1 and 102b-1 of FIG. 2A together. FIG. 2F shows top intra-batten node 132-1 that includes top transverse hinge 112-1 that couples the top battens 101a-1 and 101b-1 of FIG. 2A. FIG. 2G shows base batten-longeron node 129-1 having base transverse hinge 111-a that couples side battens 102b-1 and 102d-1 and base longitudinal strut 104a-1 of FIG. 2A together, with the base batten-longeron node 109a-1 disposed on the base longitudinal strut 104a-1. FIGS. 2H and 2I show closeup views of top batten-longeron nodes according to an implementation of the disclosed subject matter. FIG. 2H shows top batten-longeron node 128a-1 that includes top-to-side transverse hinge 110a-1 that is coupled the top batten 101a-1 of FIG. 2A. FIG. 2I shows top batten-longeron node 128b-1 that includes top-to-side transverse hinge 110b-1 that couples side batten 102c-1 and top longitudinal strut 103c-1 of FIG. 2A. Top batten-longeron node 108b-1 is coupled to top batten-longeron node 128b-1 and top longitudinal strut 103c-1, with top batten 101b-1 disposed on top longitudinal strut 103c-1. In some implementations, an additional interface node may be added that allows top batten-longeron node 128a-1 to rotate, so that top longitudinal strut 103a-1 may not fold in a plane parallel to top batten 101a-1 and top batten 101a-2.

Figure 3A:
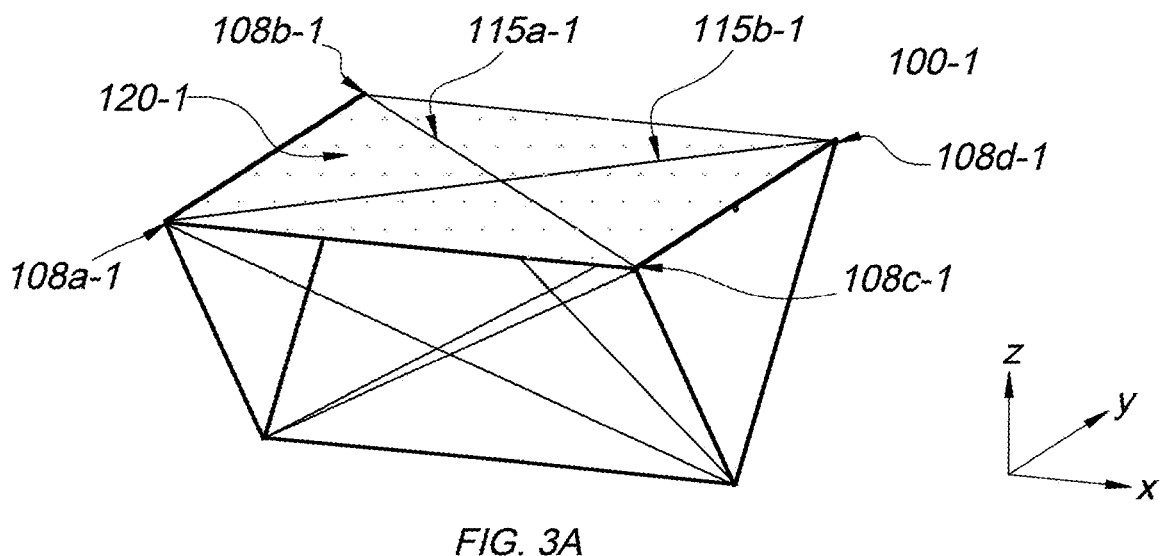
FIGS. 3A-3C show isometric views of a single bay of a DUST in a fully deployed configuration, with the external prismatic faces highlighted, according to an implementation of the disclosed subject matter.
Figure 3B:
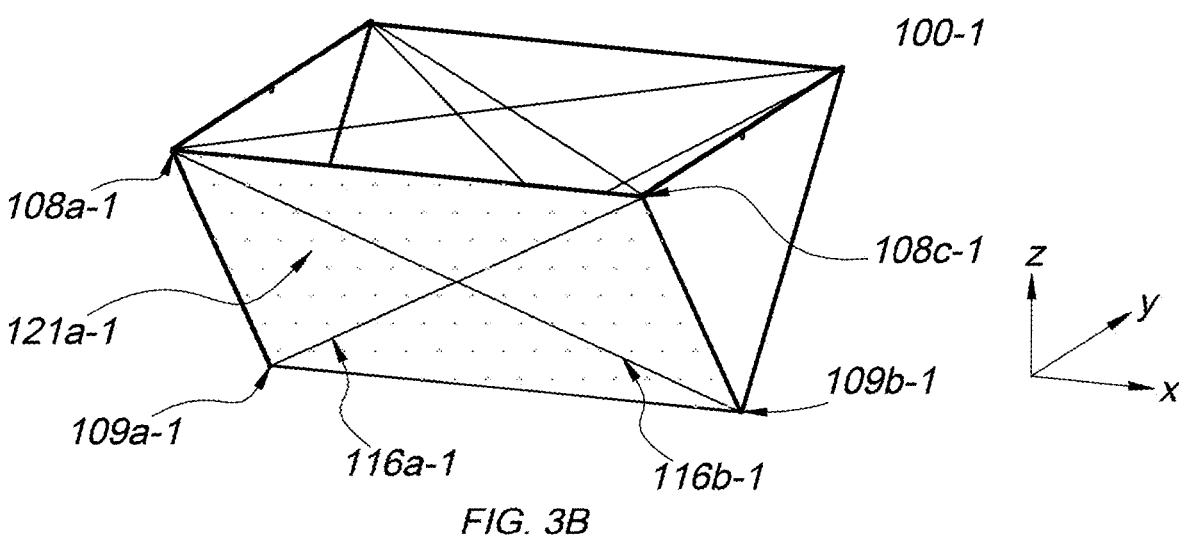
Figure 3C:
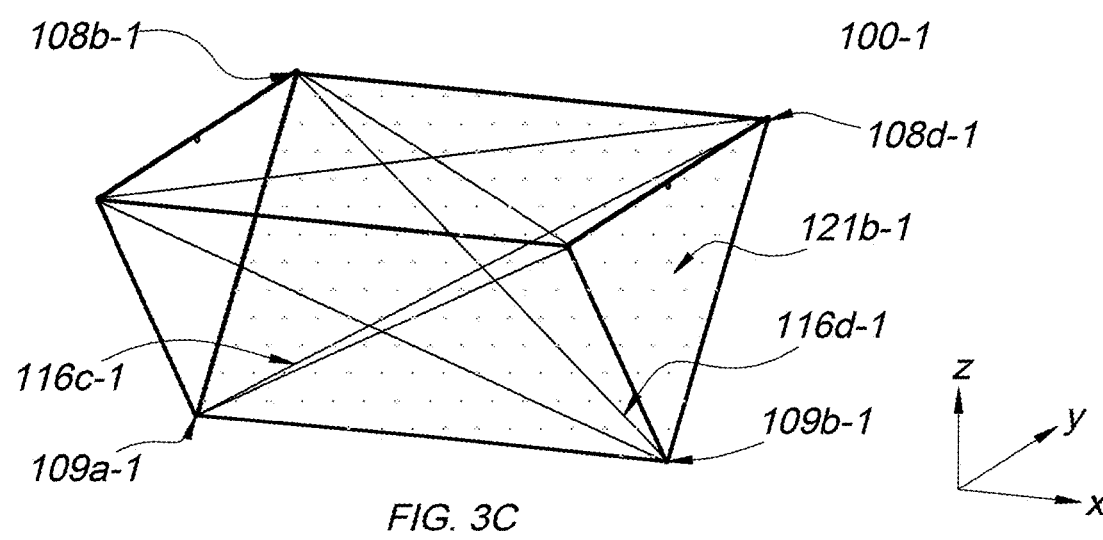

FIGS. 3A-3C show a triangular DUST 100 that may have three exterior faces, a top exterior face 120-1 and two side exterior faces 121a-1 and 121b-1 (each highlighted with dots as shown in FIGS. 3A-3C). The top exterior face 120-1 may have two tensioned top diagonals 115a-1 and 115b-1 that provide stiffness to the truss (e.g., bay 100-1 of the DUST 100). Tensioned top diagonal 115a-1 may join near the top batten-longeron nodes 108b-1 and 108c-1, while tensioned top diagonal 115b-1 may join near top batten-longeron nodes 108a-1 and 108d-1.

Side exterior face 121a-1 may have two tensioned side diagonals 116a-1 and 116b-1, which may form a cross pattern by connecting near base batten-longeron node 109a-1 and top batten-longeron node 108c-1, and near base batten-longeron node 109b-1 and top batten-longeron node 108a-1 respectively, as shown in FIG. 3B.

As shown in FIG. 3C, side exterior face 121b-1 may have two tensioned side diagonals 116c-1 and 116d-1, which may form a cross pattern by connecting near base batten-longeron node 109a-1 and top batten-longeron node 108d-1, and near base batten-longeron node 109b-1 and top batten-longeron node 108b-1 respectively.

In some implementations, the tensioned diagonals (e.g., tensioned top diagonals 115a-1 and 115b-1; tensioned side diagonals 116a-1, 116b-1, 116c-1, and/or 116d-1) may be flexible cables that are kept under tension to provide bending and torsional stiffness to the truss (e.g., bay 100-1 of the DUST 100). In some implementations, the tensioned diagonals may be rigid, with flexible elements such as cables only disposed at hinge regions (e.g., top batten-longeron nodes 108b-1, 108c-1, 108a-1, 108d-1, 108c-1, 108a-1, and/or 108b-1; base batten-longeron nodes 109a-1, 109b-1), or other regions where the tensioned diagonal may be configured to fold during stowing.

In some implementations, one or more of the tensioned diagonals (e.g., tensioned top diagonals 115a-1 and 115b-1; tensioned side diagonals 116a-1, 116b-1, 116c-1, and/or 116d-1) may include a plurality of springs. For example, one or more of the tensioned diagonals may include a first spring having a first spring constant, and a second spring having a second spring constant, where the second spring constant is a higher value than the first spring constant. The first spring may maintain tension on the tensioned diagonal as it deploys (i.e., the first spring may increase in length as the diagonal deploys). At the end of travel of the first spring during deployment, the second spring may be configured to engage to provide stiffness in the deployed configuration.

In some implementations, the tensioned diagonals may include one or more reeling mechanisms that may be affixed near nodal interfaces at the corners of each truss face and may be configured to keep the tensioned diagonals confined when the truss is stowed. The one or more reeling mechanisms may be configured to pay out the length of the tensioned diagonal cord under tension during deployment. In some implementations, the one or more reeling mechanisms may lock or bottom out before full longitudinal deployment, and a stiffer compliant mechanism such as a stiff spring (e.g., a spring with a spring constant above a predetermined value) may be used to increase the stiffness of the tensioned diagonal in the deployed state. In some implementations, the tensioned diagonals may be controlled by motors which control the rate of deployment and/or the tension of the tensioned diagonals post deployment.

Figure 4:
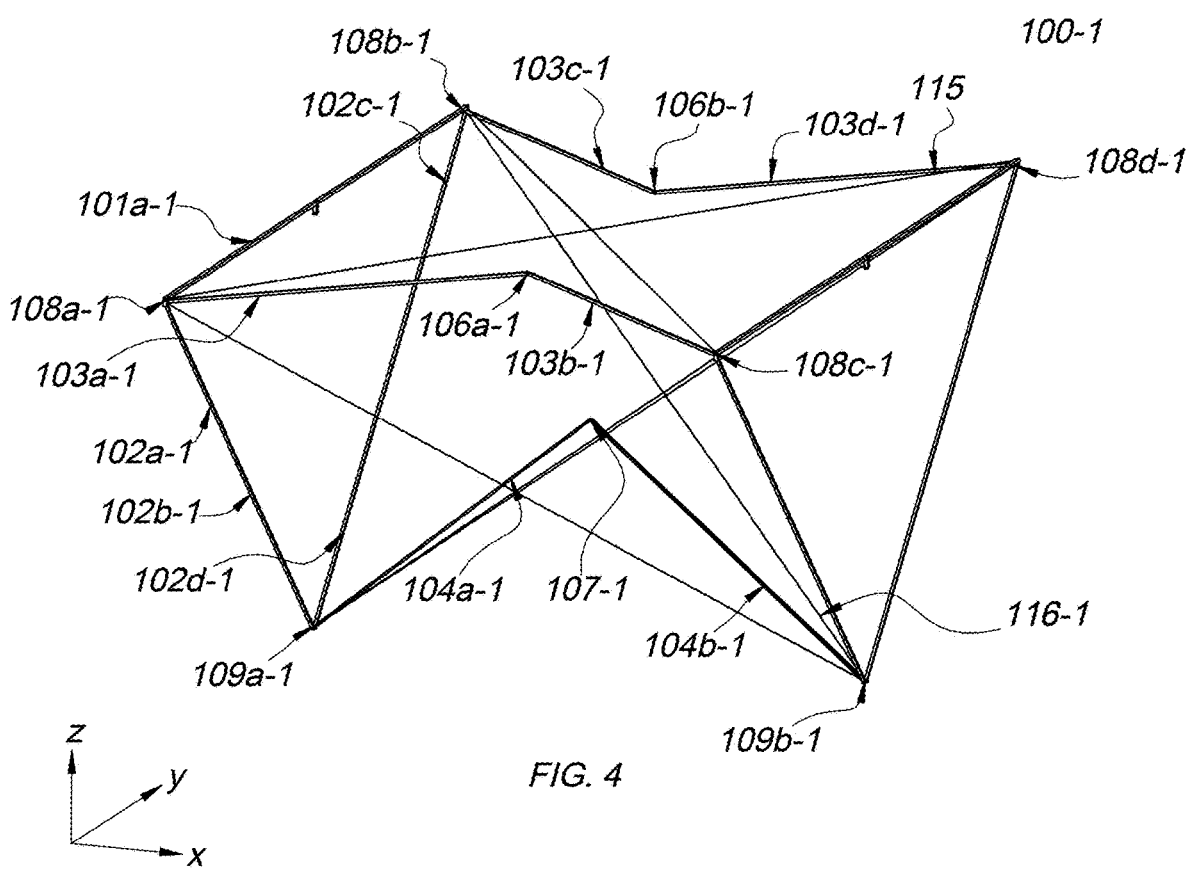
FIG. 4 shows an isometric view of a single bay of a DUST in a configuration of being partially stowed in a longitudinal direction (x) according to an implementation of the disclosed subject matter.

The top longitudinal struts 103a-1, 103b-1, 103c-1, and 103d-1 and base longitudinal struts 104a-1 and 104b-1 may be hinged to allow them to fold towards the interior of the truss bay 100-1, as shown in FIG. 4. Top longitudinal strut 103a-1 may have top batten-longeron node 108a-1 that joins at the interface between top batten 101a-1 and side batten 102a-1, while the other end of the top longitudinal strut 103a-1 is the top intra-longeron hinge 106a-1 that may interface with top longitudinal strut 103b-1. In some implementations, the top intra-longeron hinge 106a-1 may be a spring-loaded hinge, as discussed in detail above. In some implementations, the hinge axes for the top batten-longeron nodes 108a-1, 108b-1, 108c-1, and/or 108d-1 may be parallel to the transverse z direction when in the unfolded configuration allowing top longitudinal struts to fold within the same plane. In some implementations, the top longitudinal struts 103a-1, 103b-1, 103c-1, and/or 103d-1 may be configured to fold into one or more different planes. In this arrangement, there may be a reduction in the degrees of freedom of the truss 100-1.

To avoid snagging, the tensioned top diagonal (e.g., tensioned top diagonals 115a-1 and/or 115b-1) and tensioned side diagonal (tensioned side diagonals 116a-1, 116b-1, 116c-1, and/or 116d-1) may be configured to remain taut during deployment and stowing. In some implementations where the tensioned diagonals are generally rigid with only flexible elements disposed where the tensioned diagonals may be configured to bend, the tensioned diagonals may be constrained kinematically to avoid snagging.

Figure 5:
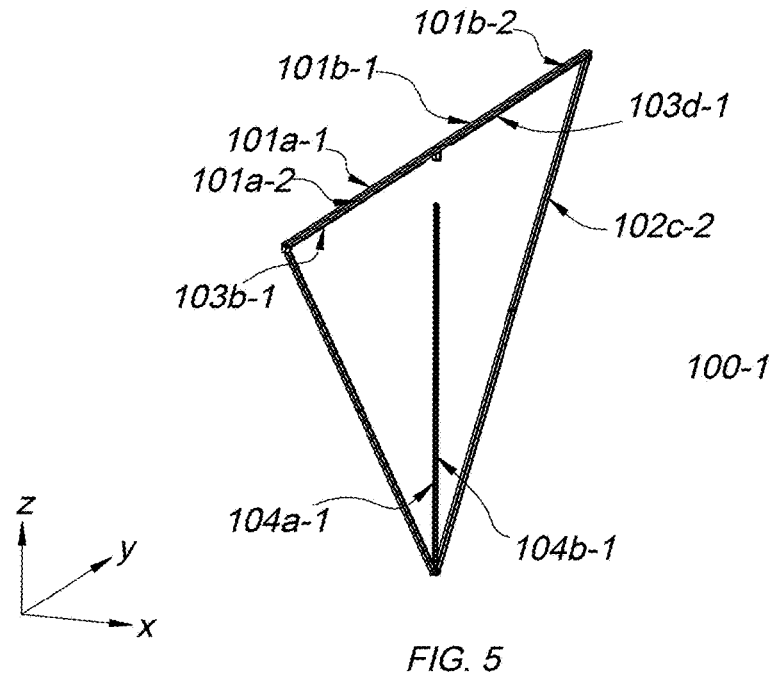
FIG. 5 shows an isometric view of a single bay of a DUST fully stowed in the longitudinal direction, but that is fully unfolded in the transverse (y and z) directions, according to an implementation of the disclosed subject matter.

FIG. 5 shows a fully stowed arrangement of the DUST according to an implementation of the disclosed subject matter, where the battens from each end of the bay (e.g., bay 100-1) are stowed adjacent to each other. For example, top batten 101a-1 is stowed against top batten 101a-2.

Figures 6A, 6B, 6C, 6D:
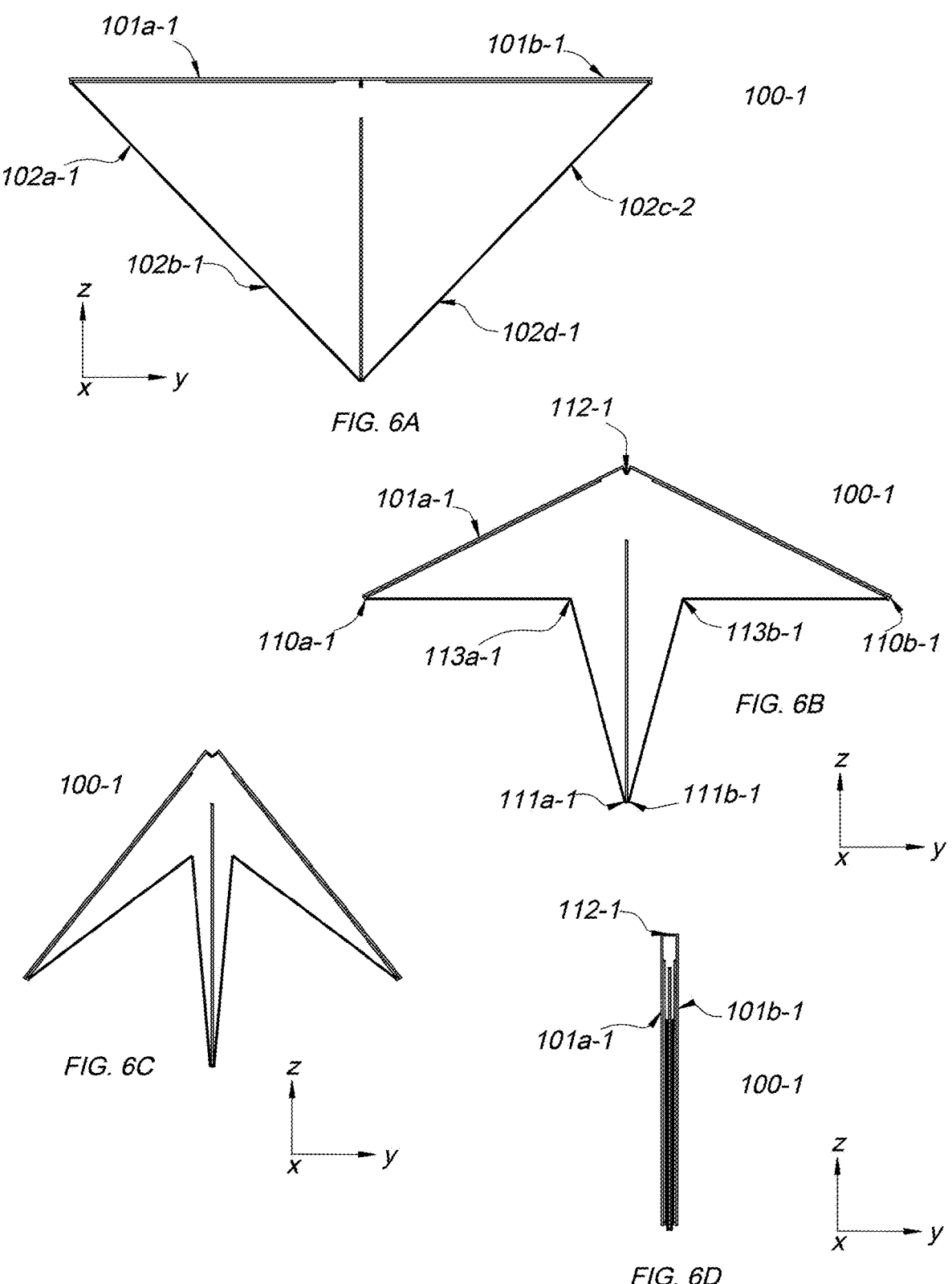
FIGS. 6A-6D show front views of a single bay of an implementation of a DUST, including steps for stowing in the transverse direction, according to an implementation of the disclosed subject matter.

FIG. 6A shows an arrangement of the bay 100-1 of the DUST as viewed along the longitudinal axis, while FIGS. 6B-6C show the bay 100-1 of the DUST as it folds transversely. The two top battens 101a-1 and 101b-1 may be connected by top transverse hinge 112-1, as shown in FIG. 6B. During stowing, top transverse hinge 112-1 may be folded so that the angle interior to the truss 100-1 between top battens 101a-1 and 101b-1 decreases. The top transverse hinge 112-1 may be a hill hinge, while hinges whose interior angle increases may be valley hinges. Top transverse hinge 112-1 may be offset from the outer side of top battens 101a-1 and 101b-1, so that it can accommodate the other battens and longitudinal struts in the fully folded configuration as shown in FIG. 6D. This offset height may be based on the thickness of the side battens (e.g., 102a-1, 102b-1, 102c-1, and/or 102d-1 as shown in FIG. 4), the base longitudinal struts (e.g., 104a-1, 104b-1 shown in FIG. 4), and the width of nodes (e.g., top batten-longeron nodes 108c-1 and 108d-1, and base batten-longeron node 109b-1 shown in FIG. 4).

In some implementations, the side batten 102a-1 may be shorter than top batten 101a-1, and side batten 102c-1 may be shorter than top batten 101b-1 in order for them to fit when fully folded. In some implementations where side battens 102a-1 and 102b-1 are the same length, the base longitudinal struts 104a-1, 104b-1 may be shorter than the side battens 102a-1 and 102b-1 to avoid intersecting with top transverse hinge 112-1.

In some implementations, side battens 102a-1 and 102c-1 may be the same length, as are side battens 102b-1 and 102d-1. This is merely an example, and the length of the side battens may be different so long as the side battens 102b-1 and 102d-1 meet at base transverse hinges 111a-1 and 111b-1 in both deployed and stowed configurations. During stowing, the top-to-side transverse hinges 110a-1 and 110b-1 that join the top battens 101a-1 and 101b-1 to the side battens 102a-1 and 102c-1 act as hill hinges. That is, when fully folded, top batten 101a-1 may be folded parallel to side batten 102a-1. The side transverse hinge 113a-1 that may connect side battens 102a-1 and 102b-1 may act as a valley hinge, and may ensure that side battens 102a-1 and 102b-1 fold parallel to each other. The side transverse hinge 113b-1 may connect side battens 102c-1 and 102d-1 may act as a valley hinge, and may ensure that side battens 102c-1 and 102d-1 fold parallel to each other. In some implementations, side battens 102d-1 and 102c-1 and top batten

101b-1 may behave in a symmetrical fashion to their opposite pair of side battens 102a-1, 102b-1 and top batten 101a-1.

The stowed configuration FIG. 6D shows how the Deployable Ultra-Stowable Truss (DUST) may package in both y and z transverse directions.

Figure 7A:
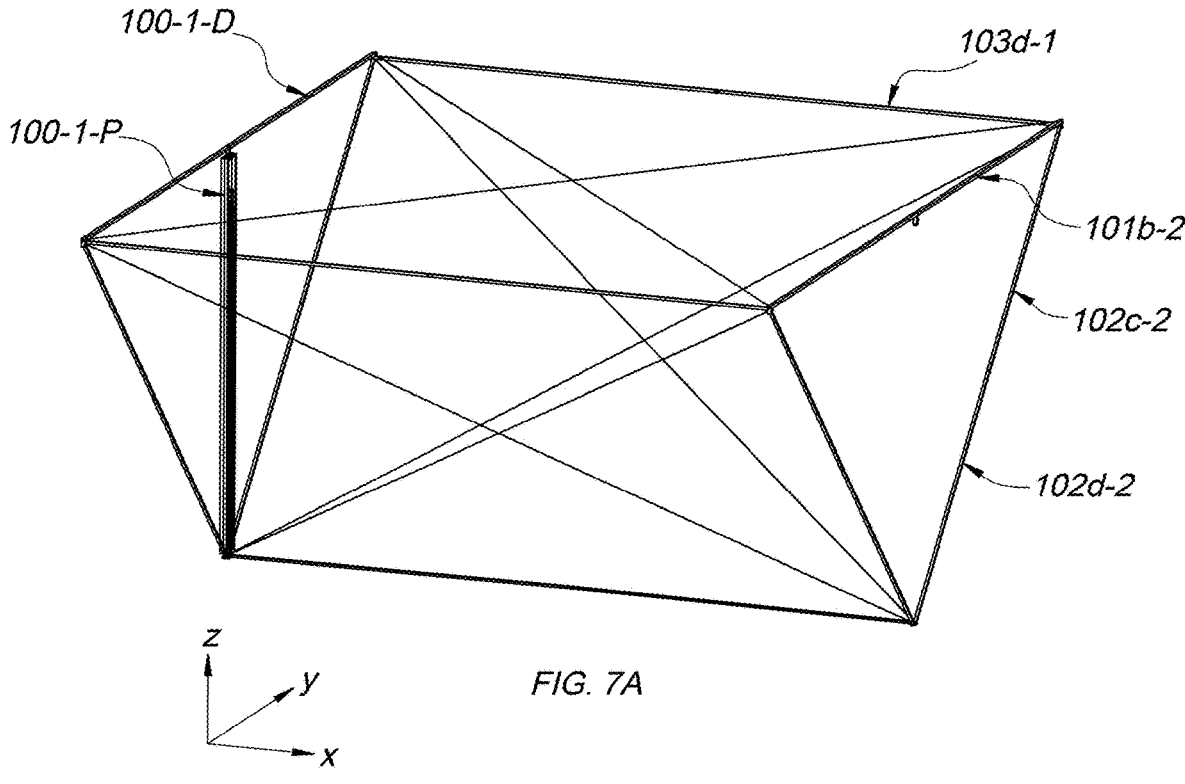
FIGS. 7A-7B show isometric and front views comparing the volume of a DUST in both the fully deployed and fully stowed and folded configurations according to an implementation of the disclosed subject matter.
Figure 7B:
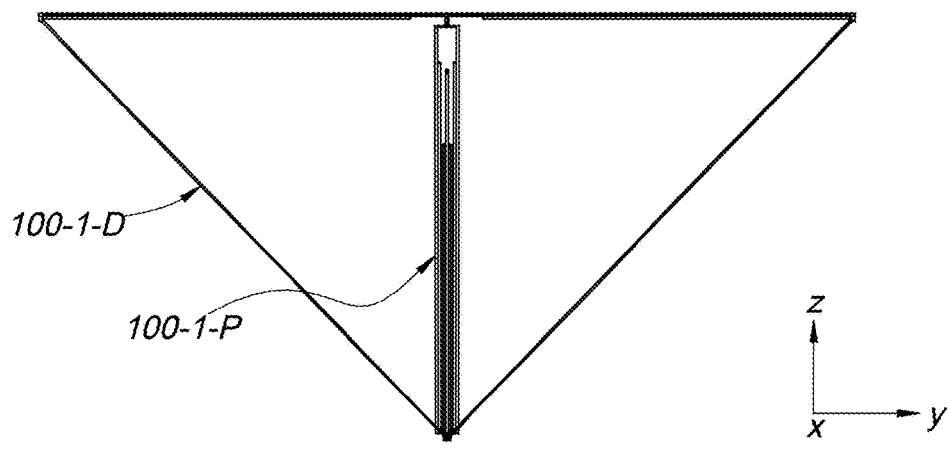

FIGS. 7A-7B show the packing efficiency of DUST according to implementations of the disclosed subject matter. An implementation of a single DUST bay in the deployed state 100-1-D is superimposed on the same implementation of a single DUST bay 100-1-P in the packaged state. In this implementation, the top longitudinal strut 103d-1 may be 5 m long, with a cross section of 0.05 m wide and 0.025 m high. The top longitudinal strut 103d-1 may be 5.5 m long, 0.038 m high and 0.05 m wide. The side battens 102c-2 and 102d-2 may both be 4 m long, with a cross-section that may be 0.0381 m high and 0.025 m wide. Together, the deployed dimensions for the single DUST bay embodiment 100-1-D may be approximately 10 m long, 11 m wide and 5.9 m high. Conversely, in the packaged state 100-1-P as shown in FIG. 7B may have dimensions of 0.1 m long, 0.4 m wide and 5.5 m high. The packaged state of implementations of the disclosed subject matter improves over current packaging arrangements (e.g., High Stiffness Extendable and Retractable Mast or "HIMAT"), which only fold in the longitudinal direction and provide a packaging efficiency of 100×. The DUST configuration of the implementations of the disclosed subject matter may fold in the longitudinal x direction, and/or may fold in the transverse y and/or z directions, enabling a packaging efficiency of 2950×, or almost 30 times better for just the truss. There may be gaps between struts, the hinges may have finite size, and the elements attached to the top struts such as solar panels or antenna may change these numbers, but a significant improvement over present packing is possible by using implementations of the disclosed subject matter.

Figure 8:
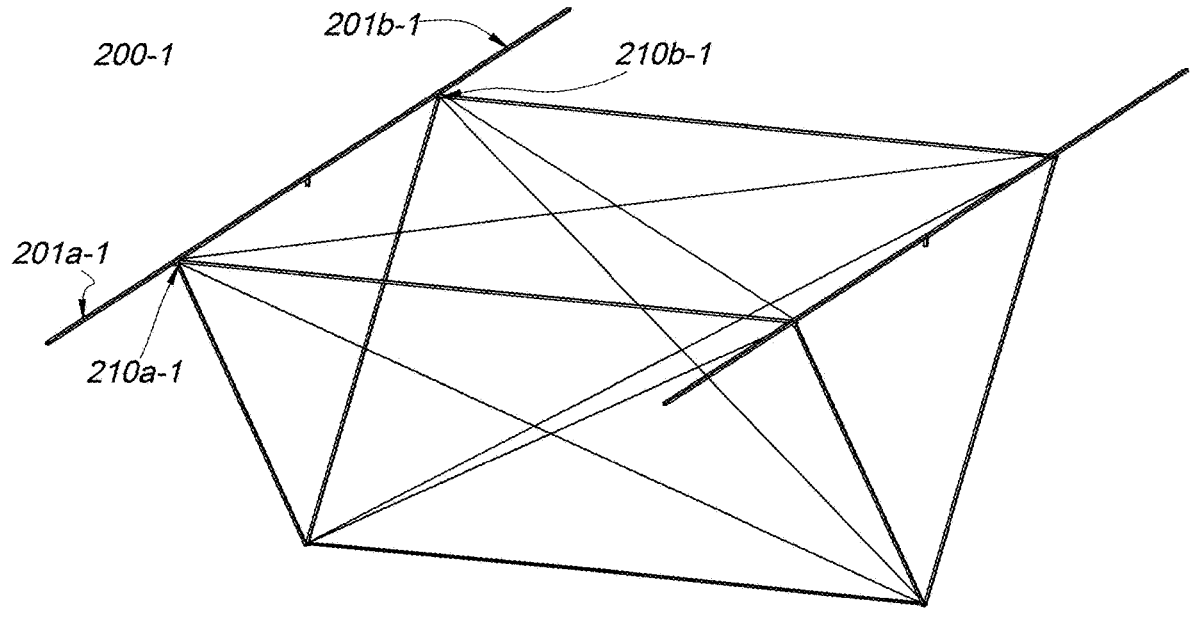
FIG. 8 shows an isometric view of a single bay of a deployed DUST with top battens that extend beyond the hinge-line with the side battens according to an implementation of the disclosed subject matter.

FIG. 8 shows an alternative implementation 200-1 of a single bay of the DUST where top batten 201a-1 may extend beyond a top-to-side transverse hinge 210a-1. FIGS. 9A-9D show how the single bay 200-1 may fold in the transverse y direction. The advantage of this implementation over current arrangements is that the minimum truss dimensions are no longer governed by the length of the top batten 201a-1. This may allow for smaller side battens 202a-1, 202b-1, which may reduce the total mass of the truss 200-1, while simultaneously increasing the buckling stiffness of the side battens 202a-1, 202b-1. The length of the top battens 201a-1, 201b-1 may be based on a size of elements, structures, and/or devices to be mounted to the top battens, such as solar arrays and/or RF antennas, while the length of the side battens 202a-1, 202b-1 may be based on the stiffness requirements of the truss, and the total deployed truss length. For example, the stiffness requirements of the truss may be based upon the overall natural frequency requirements of the spacecraft. These natural frequency requirements may be derived from the spacecraft attitude control system, payload pointing needs, and/or the ability to test the truss on the ground. External forces acting on the structure such as solar pressure, atmospheric drag, and/or rapid temperature changes (e.g., based on coming in and out of shadow or eclipse) may also factor into the stiffness requirements.

Figure 10:
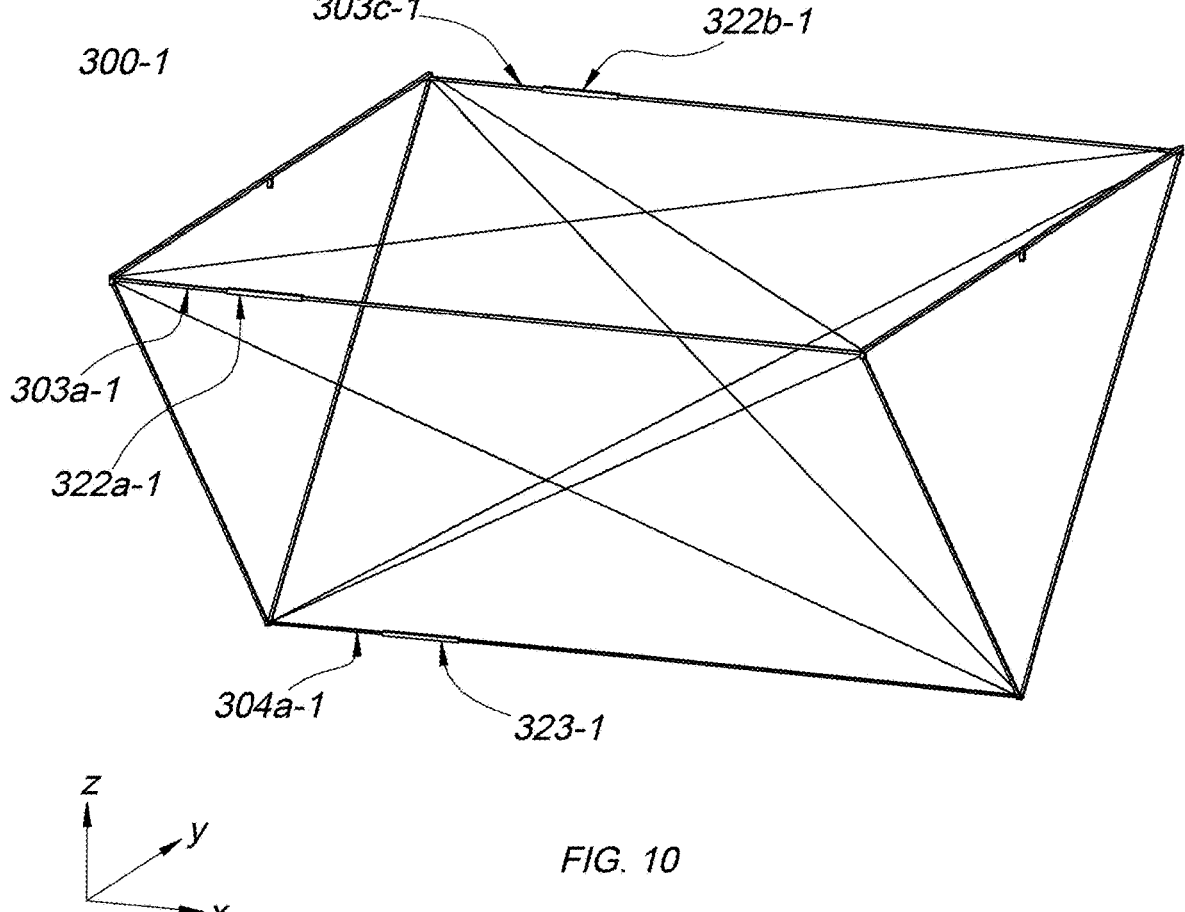
FIG. 10 shows an isometric view of a single bay of a DUST with linear actuators installed on three longerons according to an implementation of the disclosed subject matter.

FIG. 10 shows an alternative implementation of the disclosed subject matter where linear actuators 322a-1, 322b-1, and/or 323-1 may be added to the top and base longerons 303a-1, 303c-1, and 304a-1. Other implementations may include more or fewer linear actuators, both within longitudinal struts or within the batten struts. Other implementations may use actuators to control the tensioned diagonal. For a scenario where the longeron and batten lengths are the same as 100-1-D shown in FIG. 7A, linear actuators with 0.05 m of control authority may be configured to change the bay length by 0.5%, or the angle between battens at the start and end of the bay by 0.5°.

Linear actuators may enable the truss to correct for misalignments and imperfections, such as those arising from manufacturing and/or assembly tolerances, thermal expansion, and/or solar pressure. This may reduce the level of quality control needed to deploy very large structures in space. Motors of the linear actuators may be configured to provide active control and be able to damp out vibrations within the truss.

Figure 11:
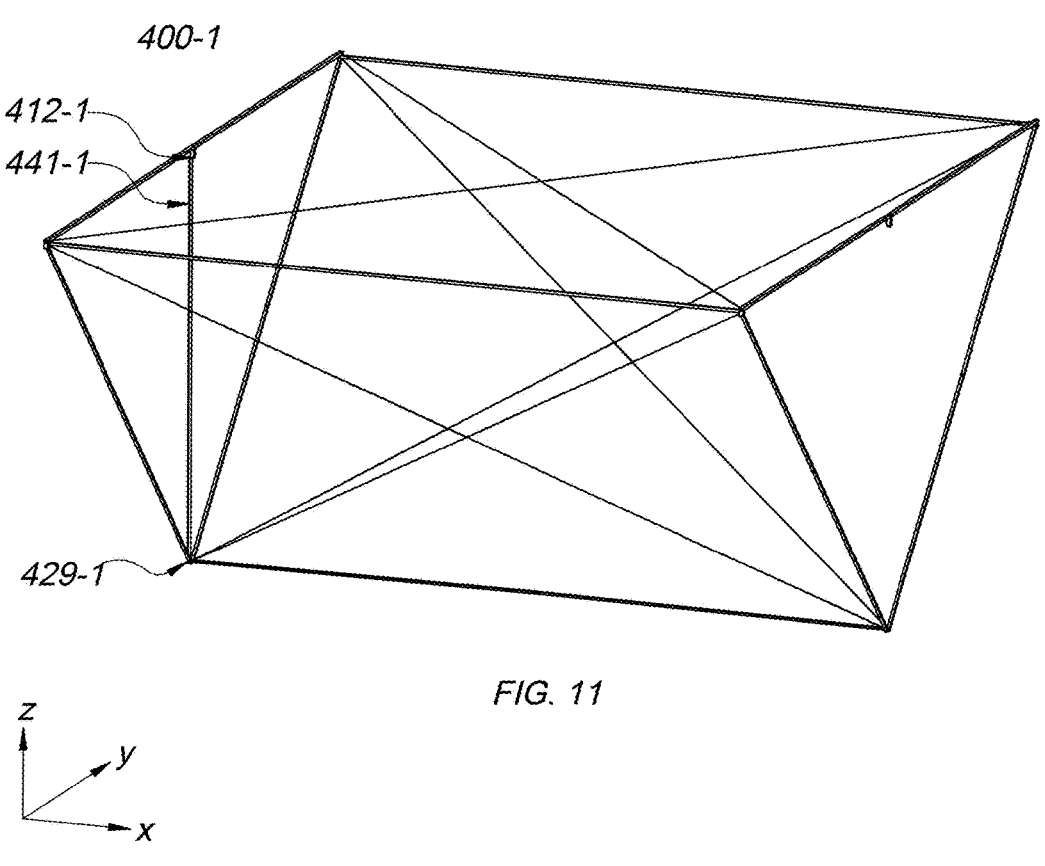
FIGS. 11-12 show an isometric view and front view, respectively, of a single bay of a DUST where the geometry of the battens is such that the distance between a base transverse hinge and a top transverse hinge may remain unchanged during transverse deployment, according to an implementation of the disclosed subject matter.
Figure 12:
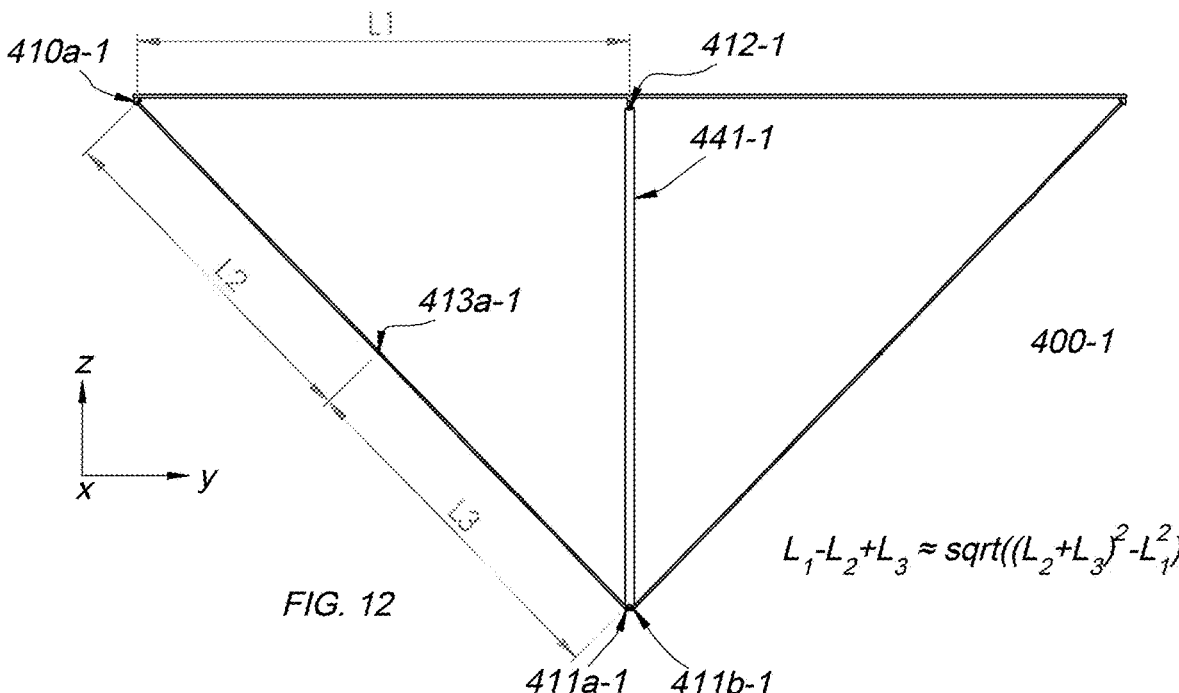
Figures 13A, 13B, 13C, 13D:
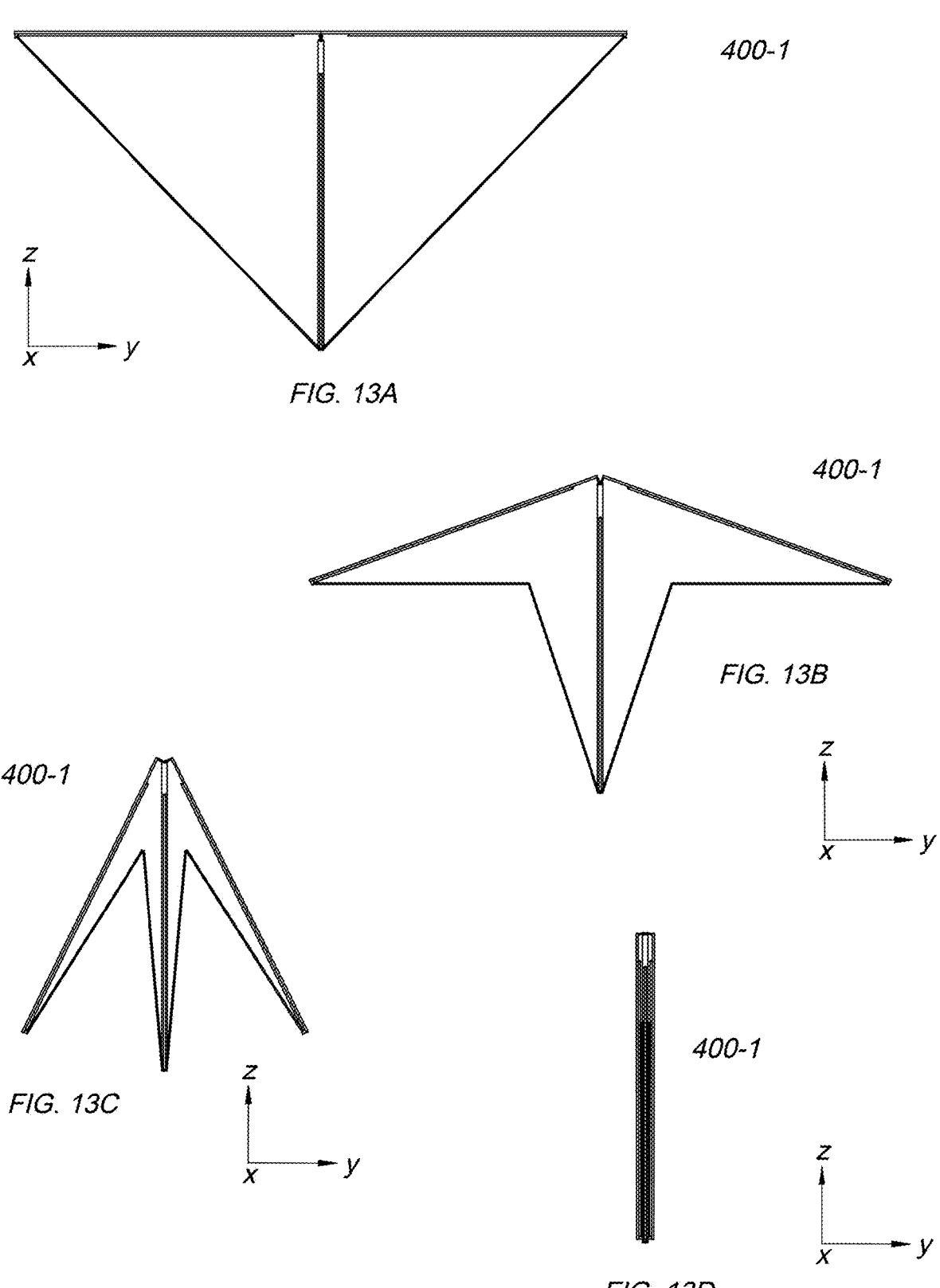
FIGS. 13A-13D show front views of a single bay of DUST, including steps for stowing in the transverse direction, for an arrangement where a distance between a base transverse hinge and a top transverse hinge may remain unchanged during transverse stowing according to implementations of the disclosed subject matter.

FIGS. 11-12 show an isometric view and front view of an alternative implantation 400-1 of single bay of an implementation of DUST, where the distance between base transverse hinges 411a-1 and 411b-1, and top transverse hinge 412-1 may remain constant during transverse stowing, such that this distance is equal in both the transversely stowed and transversely deployed configurations. In this case, the distance between a top-to-side transverse hinge 410a-1 and the top transverse hinge 412-1 may be set at L1, the distance between the top-to-side transverse hinge 410a-1 and side transverse hinge 413a-1 may be set as L2, and the distances between the side transverse hinge 413a-1 and the base transverse hinge 411a-1 may be set as L3. When stowed, the vertical (z) height between the top transverse hinge 412-1 and the base transverse hinge 411a-1 may be L1−L2+L3. In the transversely deployed state, if the top-to-side transverse hinge 410a-1 and the top transverse hinge 412-1 are at equal z height, then the vertical (z) height between the top transverse hinge 412-1 and the base transverse hinge 411a-1 may be found via the Pythagorean theorem, and may be sqrt $((L2+L3)^2-L1^2)$. Setting these two distances to be equal allows for the L1, L2, and L3 to be solved for this case. In some implementations, the equation may be adjusted, such as if the top-to-side transverse hinge 410a-1 and the top transverse hinge 412-1 are not at the same z height, or if the base transverse hinge 411a-1 and top transverse hinge 412-1 are not at the same y distance.

An advantage of setting the distance between the base transverse hinges 411a-1 and 411b-1, and the top transverse hinge 412-1 to be constant during transverse stowing may be that it allows a yoke plate 441-1 to connect a base transverse node 429-1 and the top transverse hinge 412-1. This may be used to connect the truss to a spacecraft solar array drive assembly, or a yoke, or to mount additional equipment.

FIG. 13A-13D show front views of a single bay of an implementation 400-1 of DUST during an example transverse stowing process. As shown in FIGS. 13A-13D, the distance between the base transverse hinges 411a-1 and 411b-1, and the top transverse hinge 412-1 may remain fixed.

Figure 14A:
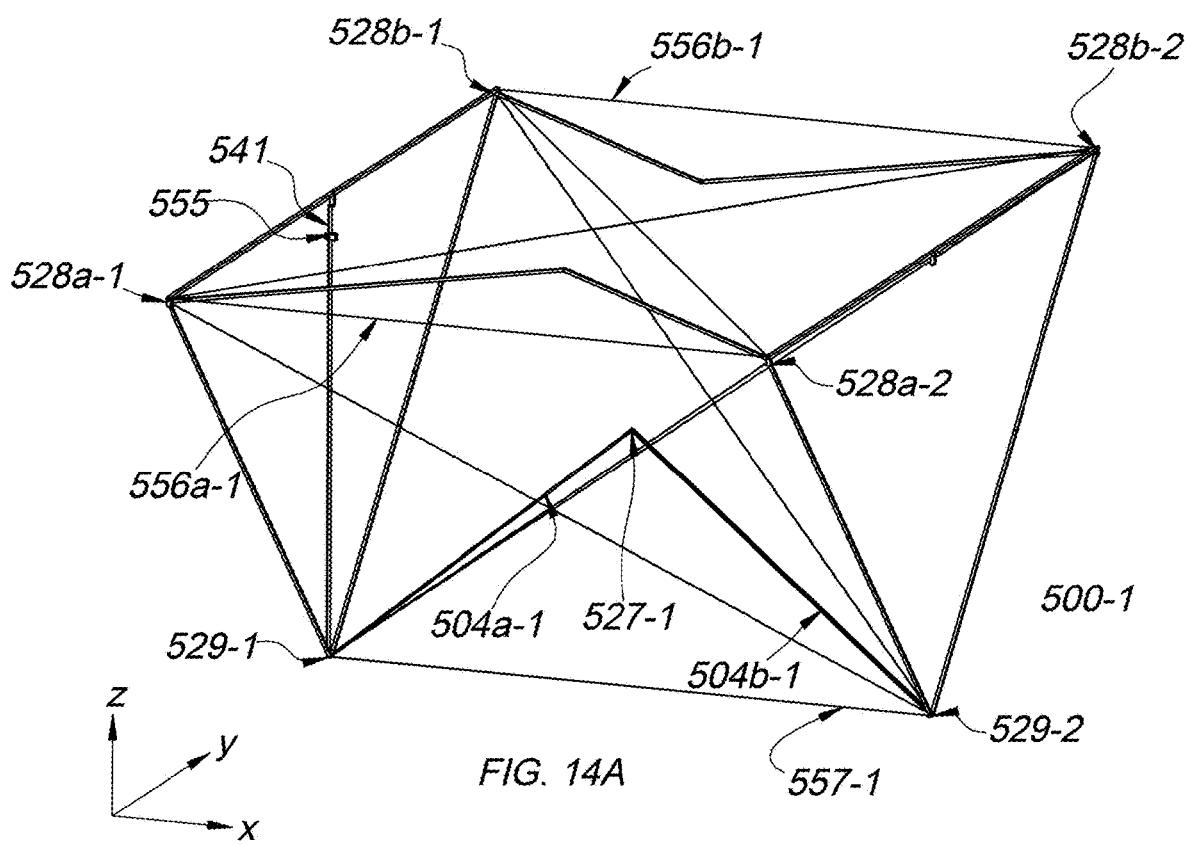
FIG. 14A shows an isometric view of a single bay of an implementation of DUST which may include spring loaded nodes for self-deployment, and a deployment control mechanism configured to control the rate of longitudinal deployment or for longitudinal retraction according to an implementation of the disclosed subject matter.

FIG. 14A shows an isometric view of a single bay of an implementation 500-1 of DUST which includes spring loaded nodes for self-deployment, and a deployment control mechanism that may be configured to control the rate of longitudinal deployment or for longitudinal retraction. A deployment control mechanism, such as a deployment motor 555 may be used to control the rate of deployment. As shown in FIG. 14A, a deployment motor 555 may be mounted on a yoke plate 541. The deployment motor 555 may be configured to unspool side restraint lanyards 556a-1 and/or 556b-1, and/or a base restraint lanyard 557, which in turn may control the rate of deployment of the longitudinal struts, such as base longitudinal struts 504a-1 and 504b-1. The restraint lanyards 556a-1 and/or 556b-1, and/or a base restraint lanyard 557 may be used to control deployment such that the plane formed by top batten-longeron nodes 528a-1, 528b-1 and base batten-longeron node 529-1, and the plane formed by top batten-longeron nodes 528a-2, 528b-2 and base batten-longeron node 529-2 may remain co-planar to provide a controlled longitudinal deployment. This arrangement may also allow for greater stored energy in the system, since the truss may not need to withstand the shock loads of that which would occur at the end of deployment if the truss deployed without a deployment control mechanism. In some implementations, tensioned diagonals may be deployed in addition to and/or as an alternative to side restraint lanyards 556a-1 and/or 556b-1, and/or base restraint lanyard 557.

Figure 14B:
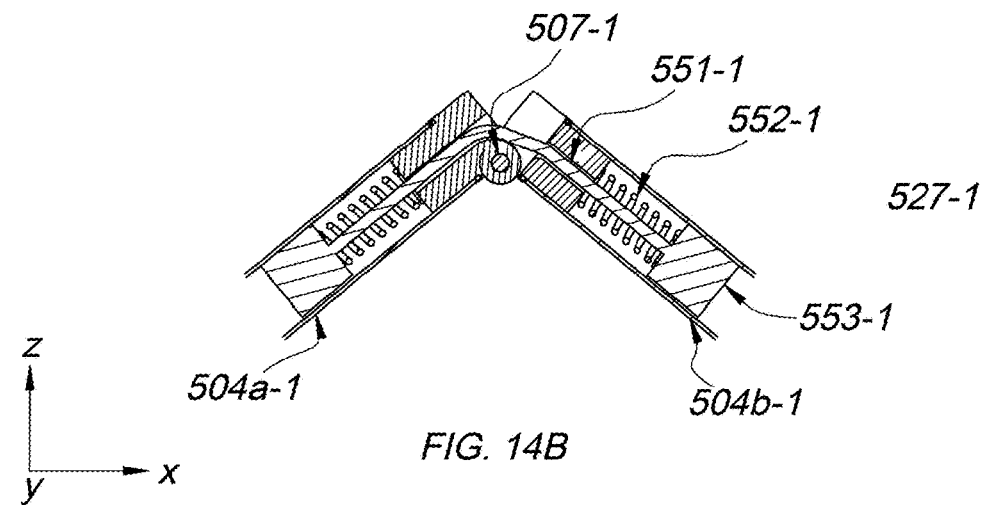
FIG. 14B shows a cross-section of an example intra-longeron node that may include springs for self-deployment according to an implementation of the disclosed subject matter.

FIG. 14B shows a detailed cross-sectional view of the base intra-longeron node 527-1 of FIG. 14A that may include springs for self-deployment according to an implementation of the disclosed subject matter. As shown in FIG. 14B, the nodes may include a stored energy mechanism, such as compression springs, tension springs or torsion springs, or motors and/or other deployment mechanisms, that may be used to provide the torque or force needed to deploy the battens and/or longitudinal struts. FIG. 14B shows a cross-section of an example mechanism joining longitudinal struts 504a-1 and 504b-1. A node deployment lanyard 551-1 may be configured to travel around the base intra-longeron hinge 507-1, where the node deployment lanyard 551-1 may connect two node end stops 553-1. In this implementation, one or more node deployment springs 552-1 may be disposed between the base intra-longeron hinge 507-1 and the node deployment end stops 553-1 to provide the opening force. This opening force may be used to keep the longitudinal struts 504a-1 and 504b-1 in the deployed configuration in the absence of a latching mechanism, or in addition to it. In alternative implementations, the node deployment lanyard may run the length of the bay or truss, and be controlled by one or more motors to deploy multiple longitudinal struts or battens. Any or all nodes may contain latches, and/or any or all hinges may be spring loaded with springs, strain-energy mechanisms or motors for deployment. For example, at least a portion of the hinges may be spring loaded to provide redundancy and/or smooth deployment.

In some implementations, motors may be used on the nodes to provide deployment and retraction. In some implementations, latches may be applied to one or more nodes to lock adjacent battens or longerons in position once the truss is deployed transversely for battens, or longitudinally for longitudinal struts.

Figure 15:
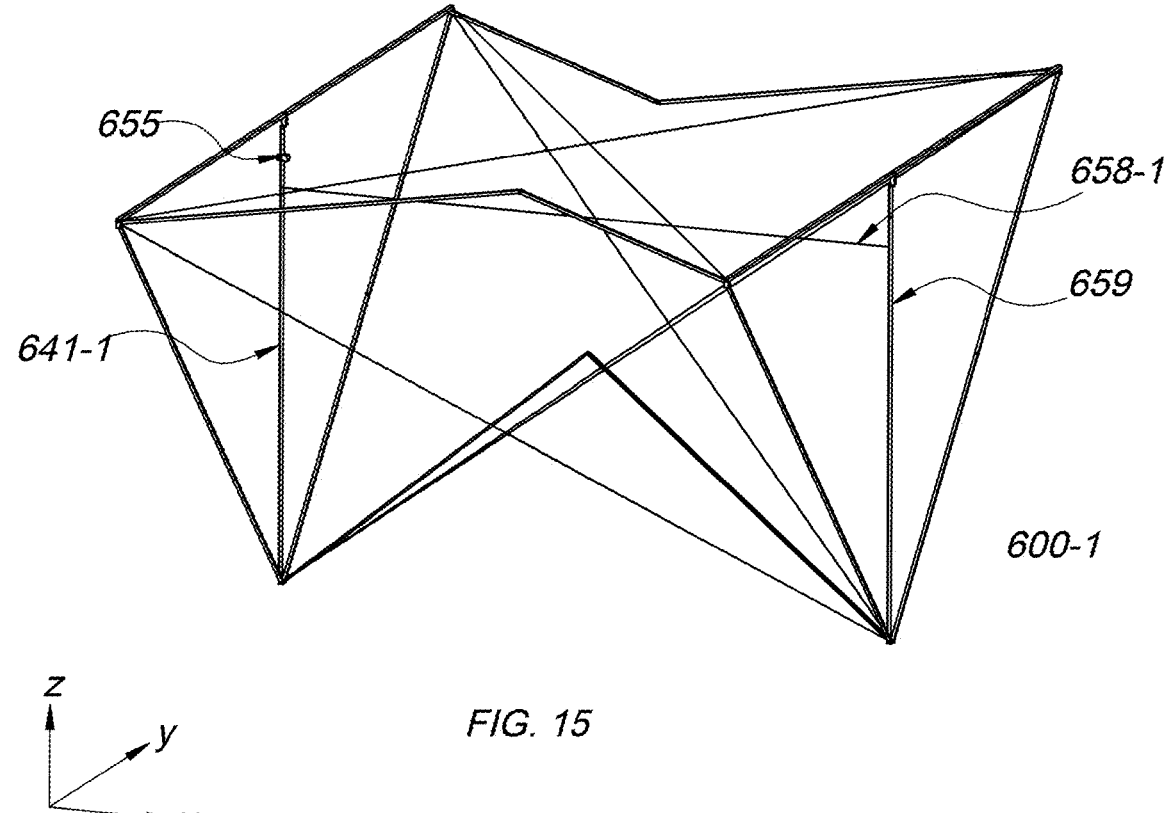
FIG. 15 shows an isometric view of a single bay of an implementation of DUST that uses a single lanyard that may be configured to control deployment and retraction according to an implementation of the disclosed subject matter.

FIG. 15 shows an isometric view of a single bay of an implementation of DUST that uses a single lanyard for controlling deployment and retraction. As shown in FIG. 15, a single central deployment lanyard 685-1 may connect a deployment mechanism 655 with an end plate 659. The end plate 659 may be on each bay, or just at the end of the truss. The deployment mechanism 655 may be configured to control the rate of longitudinal deployment of the bay, and may be simpler than the example mechanism arrangement that joins longitudinal struts 504a-1 and 504b-1, but may have a reduction in the control of the relative rotation of the bay ends to the same degree.

Figures 16A, 16B, 16C:
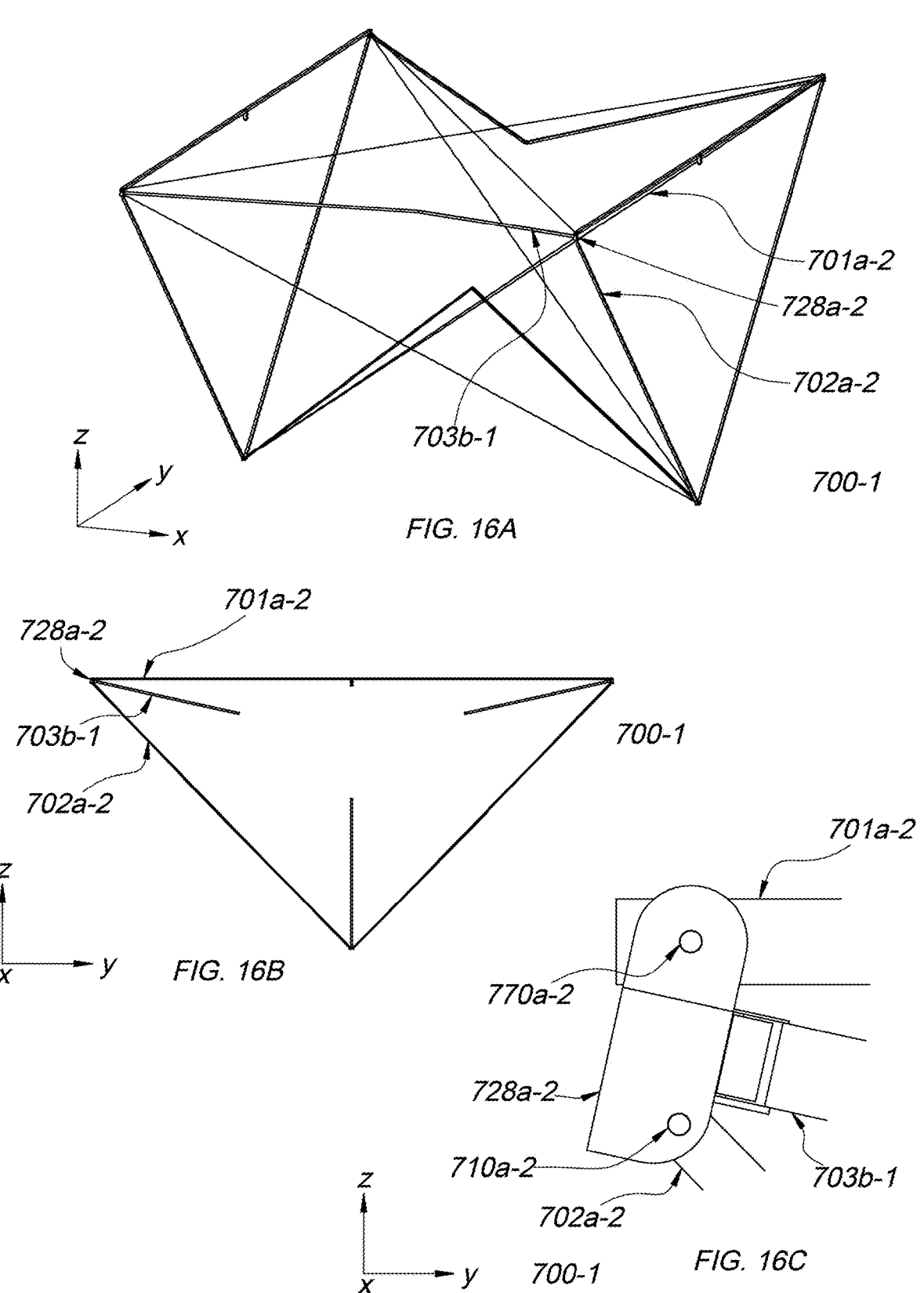
FIGS. 16A-16B show an isometric and front view, respectively, of a single bay of an implementation of DUST where the top longerons may not fold in the same plane according to implementations of the disclosed subject matter.
FIG. 16C shows a close-up view of the top batten-longeron node according to an implementation of the disclosed subject matter.

In some implementations, an additional top strut hinge 770a-2 whose axis is parallel to the x direction may be added between the top batten-longeron node 728a-1 and the top batten 701a-2, as shown in FIGS. 16A-16C. This arrangement may allow the top longitudinal strut 703b-1 to not be parallel to the top batten 701a-2 when in the transversely deployed state. This may reduce the number of degrees of freedom that the truss may experience during deployment, aiding in keeping the ends of the bay closer to parallel during longitudinal deployment.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system comprising:
a truss comprising a plurality of bays, where each bay comprises:
a plurality of longerons disposed in a longitudinal direction, including a first longeron, a second longeron, and a third longeron, each having at least two longitudinal struts with hinges connecting the longitudinal struts; and
a plurality of battens disposed in a transverse direction, wherein the plurality of battens comprise top battens and side battens that are connected to form a triangle, wherein two of the top battens connect the first longeron and the second longeron, wherein the side battens connect with the first longeron, second longeron, third longeron, and the top battens, and wherein the top battens and the side battens are configured with hinges, with the hinges of the top battens being configured to allow the top battens to fold in an outwardly convex manner,
wherein the at least two longitudinal struts of the first longeron, second longeron and the third longeron are coupled by hinges that are configured to allow the at least two longitudinal struts to fold towards an interior of each bay of the truss,
wherein the at least two longitudinal struts, the plurality of longerons, and the plurality of battens are connected to form the bay, wherein each side of the bay is formed from two of the side battens that are joined end-to-end, and
wherein the side battens and top battens respectively separate at least some of the plurality of longerons, and wherein the truss is configured to be stowed longitudinally.

2. The system of claim 1, wherein the truss is configured to be stowed longitudinally by folding the hinges connecting the longitudinal struts so that a first set of battens of the plurality of battens disposed at a first end of the bay are stacked adjacent to a second set of battens disposed at a second end of the bay.

3. The system of claim 1, wherein the truss has a length and a cross section, where the cross-section changes along the length of the truss.

4. The system of claim 1, wherein at least one selected from the group consisting of: the hinges of the top battens, and the hinges of the side battens have an axis of rotation that is parallel to the longitudinal direction.

5. The system of claim 1,
wherein at least some of the plurality of longerons comprise top longerons and base longerons, including the first longeron and the second longeron.

6. The system of claim 5, wherein two of the top battens connect two of the top longerons.

7. The system of claim 6, wherein the two top battens are connected via a hinge that is offset from a centerline in a transverse direction internal to the truss.

8. The system of claim 1, further comprising:
a plurality of tensioned diagonals disposed on external faces of each bay of the plurality of bays of the truss.

9. The system of claim 8, wherein at least one of the plurality of tensioned diagonals comprises: a first spring having a first spring constant, and a second spring having a second spring constant, wherein the second spring constant is a higher value than the first spring constant.

10. The system of claim 1, wherein the plurality of longitudinal struts comprises a plurality of top longitudinal struts and a plurality of side longitudinal struts,
and
wherein the side battens are connected to the top longitudinal struts and the side longitudinal struts via hinges that have axes of rotation that are parallel to the longitudinal direction.

11. The system of claim 10, wherein:
a valley hinge connects at least two of the side battens, at least two of the plurality of battens are connected to one another at the first longeron, where the connection is via a hill hinge,
wherein the truss is configured to be stowed by folding the hill hinge and valley hinge so that at least the two side battens, at least some of the plurality of battens, and at least some of the plurality of longerons package against one another.

12. The system of claim 1, wherein when the truss is folded, one or more battens of the plurality of battens are uncovered and are configured to have one or more hardware elements mounted to the one or more uncovered battens.

13. The system of claim 12, wherein the one or more uncovered battens are configured to mount at least one selected from a group consisting of: a solar array, and an antenna.

14. The system of claim 12, wherein one or more battens for each bay of the plurality of repeating bays are configured to be external during stowage and deployment.

15. The system of claim 1, wherein at least one of the plurality of battens extends beyond a junction with at least one of the plurality of longerons.

16. The system of claim 1, further comprising at least one linear actuator coupled to one or more of the plurality of longerons to control a length of the one or more longerons.

17. The system of claim 1, further comprising:
a sequencing mechanism configured to deploy one or more of the plurality of bays, one at a time, in a longitudinal direction.

18. The system of claim 1, wherein at least some of the plurality of battens are arranged between a first base transverse hinge and a second base transverse hinge and a top transverse hinge, wherein a distance between the first base transverse hinge, the second base transverse hinge, and a top transverse hinge remains constant during stowing.

19. The system of claim 18, wherein the distance is equal in both a transversely stowed configuration and a transversely deployed configuration.

* * * * *